US012757108B2

(12) United States Patent
Chaponniere et al.

(10) Patent No.: US 12,757,108 B2
(45) Date of Patent: Oct. 6, 2026

(54) TECHNIQUES FOR PERFORMING A NETWORK SWITCHING OPERATION

(71) Applicant: QUALCOMM INCORPORATED, San Diego, CA (US)

(72) Inventors: Lenaig Genevieve Chaponniere, La Jolla, CA (US); Sunghoon Kim, San Diego, CA (US); Amer Catovic, San Diego, CA (US); Sitaramanjaneyulu Kanamarlapudi, San Diego, CA (US); Haris Zisimopoulos, London (GB); Waqar Zia, Munich (DE); Sebastian Speicher, Wallisellen (CH)

(73) Assignee: QUALCOMM Incorporated, San Diego, CA (US)

( * ) Notice: Subject to any disclaimer, the term of this patent is extended or adjusted under 35 U.S.C. 154(b) by 271 days.

(21) Appl. No.: 18/245,507

(22) PCT Filed: Oct. 25, 2021

(86) PCT No.: PCT/US2021/072014
§ 371 (c)(1),
(2) Date: Mar. 15, 2023

(87) PCT Pub. No.: WO2022/099242
PCT Pub. Date: May 12, 2022

(65) Prior Publication Data

US 2023/0370964 A1 Nov. 16, 2023

(30) Foreign Application Priority Data

Nov. 5, 2020 (GR) .............................. 20200100667

(51) Int. Cl.

| | |
|---|---|
| ***H04W 48/18*** | (2009.01) |
| ***H04W 4/90*** | (2018.01) |
| ***H04W 48/06*** | (2009.01) |

(52) U.S. Cl.
CPC ............. *H04W 48/18* (2013.01); *H04W 4/90* (2018.02); *H04W 48/06* (2013.01)

(58) Field of Classification Search
CPC ....... H04W 48/18; H04W 4/90; H04W 48/06; H04W 8/18; H04W 8/205; H04W 48/02; H04W 48/10

(Continued)

(56) References Cited

U.S. PATENT DOCUMENTS

| | | | | |
|---|---|---|---|---|
| 2007/0191006 A1 | | 8/2007 | Carpenter | |
| 2012/0100848 A1 | * | 4/2012 | Miklos .................. | H04W 16/08 455/432.1 |

(Continued)

FOREIGN PATENT DOCUMENTS

| | | | |
|---|---|---|---|
| CN | 111466109 | A | 7/2020 |
| WO | WO-2018232560 | A1 | 12/2018 |

(Continued)

OTHER PUBLICATIONS

"3GPP; Technical Specification Group Services and System Aspects; Study on Support for Minimization of Service Interruption (Release 17)", 3GPP TR 22.831, Mobile Competence Centre, France, vol. SA WG1, No. V17.1.0, Dec. 27, 2019, pp. 1-19, XP051841004, 5.2 A Well-Handled Disaster Begins 5.5 Network Reselection During Disaster with Previous Reject 5.6 Network Protection for Surge of Incoming Users During Disaster 5.7 Use Case on Access Control for "backup" PLMN 5.10 Use Case on "Backup" PLMNs for the International Roamer, Section 5.2.3.

(Continued)

*Primary Examiner* — Huy C Ho
(74) *Attorney, Agent, or Firm* — QUALCOMM IP DEPT.; James Hunt Yancey, Jr.

(57) ABSTRACT

Methods, systems, and devices for wireless communications are described. A user equipment, UE, may identify (305) that (Continued)

the UE is not connected with a first network to which the UE subscribes, and identify a fallback configuration (310). The UE may determine (315), based on the fallback configuration, a second network of one or more other networks with which the UE is to connect. The UE may attempt (320) to connect with the second network based on the fallback configuration and the UE not being connected with the first network. In some cases, a base station of a network may establish a connection with UEs based on receiving registration messages from the UEs in response to transmitting an indication that the network is available as a fallback network, identify a congestion level of the network and switch to a non-subscriber rejection mode in which the base station rejects connection with non-subscriber UEs.

35 Claims, 18 Drawing Sheets

(58) Field of Classification Search
USPC .......................................................... 370/328
See application file for complete search history.

(56) References Cited

U.S. PATENT DOCUMENTS

| | | | | |
|---|---|---|---|---|
| 2013/0316699 | A1 | 11/2013 | Jheng et al. | |
| 2014/0023059 | A1 | 1/2014 | Gupta | |
| 2015/0350870 | A1 | 12/2015 | Horn et al. | |
| 2016/0278096 | A1 | 9/2016 | Watfa et al. | |
| 2016/0345334 | A1 | 11/2016 | Veerepalli et al. | |
| 2017/0118737 | A1* | 4/2017 | Batchu | H04W 68/005 |
| 2023/0034647 | A1* | 2/2023 | Velev | H04W 36/00226 |

FOREIGN PATENT DOCUMENTS

| | | | |
|---|---|---|---|
| WO | WO-2021015597 | A1 | 1/2021 |
| WO | WO-2021151811 | A1 | 8/2021 |

OTHER PUBLICATIONS

International Search Report and Written Opinion—PCT/US2021/072014—ISA/EPO—Feb. 4, 2022.

Qualcomm Incorporated: "Key Issues for MINT", 3GPP Draft, 3GPP TSG CT WG1 Meeting #126-e, C1-205944, 3rd Generation Partnership Project (3GPP), Mobile Competence Centre, 650, Route Des Lucioles, F-06921 Sophia-Antipolis Cedex, France, vol. CT WG1, No. Electronic Meeting, Oct. 15, 2020-Oct. 23, 2020, Oct. 7, 2020 (Oct. 7, 2020), XP051950700, 3 Pages.

Qualcomm Incorporated: "Solution to MINT Key Issue #5 (PLMN Selection when a "Disaster Condition" Applies)", 3GPP Draft, 3GPP TSG-CT WG1 Meeting #127bis-e, C1-210335, 3rd Generation Partnership Project (3GPP), Mobile Competence Centre, 650, Route Des Lucioles, F-06921 Sophia-Antipolis Cedex, France, vol. CT WG1, No. Electronic meeting, Jan. 25, 2021-Jan. 29, 2021, Jan. 28, 2021, XP051975451, 6 Pages, 6.A Solution#A: Solution for PLMN Selection When a "Disaster Condition" Applies.

3GPP: "3rd Generation Partnership Project, Technical Specification Group Services and System Aspects, Study on Support for Minimization of Service Interruption (Release 17)", S1-192361, TR 22.831 V0.2.0, Aug. 2019, 20 Pages.

EPO Communication under Rule 71(3) EPC—2100781EP, Oct. 6, 2025, 102 Pages.

Response to Communication Pursuant to Rules 161(1) and 162 EPC Filed on Dec. 13, 2023 for EP Application No. 21807495.3, 26 pages.

* cited by examiner

TECHNIQUES FOR PERFORMING A NETWORK SWITCHING OPERATION

CROSS REFERENCES

The present Application is a 371 national stage filing of International PCT Application No. PCT/US2021/072014 by Chaponniere et al. entitled "TECHNIQUES FOR PERFORMING A NETWORK SWITCHING OPERATION," filed Oct. 25, 2021; and claims priority to International Patent Application No. 20200100667 by Chaponniere et al. entitled "TECHNIQUES FOR PERFORMING A NETWORK SWITCHING OPERATION," filed Nov. 5, 2020, each of which is assigned to the assignee hereof, and each of which is expressly incorporated by reference in its entirety herein.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may be a subscriber to a network. In some cases, the network may be unable to provide service to the subscribers of the network. For example, a disaster could occur that renders the network unable to provide service within an area. In another example, a network may lack coverage in one or more areas. In such cases, subscribers of the network may contend for service from another network to which the UEs are not subscribed—via roaming. Conventional techniques associated with a UE switching networks in such circumstances may be improved.

SUMMARY

The described techniques relate to improved methods, systems, devices, and apparatuses that support techniques for performing a network switching operation. Generally, the described techniques provide for enhanced network switching procedures. A network (or network device) and UEs may implement techniques to mitigate overloading networks with non-subscriber UEs. For example, a network may transmit a broadcast message that indicates that the network is accepting non-subscriber UEs. The broadcast message may, in some instances, be triggered by a disaster that has rendered a network unavailable. When a network is unavailable, other available networks may transmit the broadcast message to subscribers of the unavailable network. In response to the broadcast message, the non-subscriber UEs may transmit a request to connect to one of the available networks. However, in some cases, for example, when an otherwise available network becomes congested due to an influx of non-subscriber UEs, the network may refrain from transmitting the indication and as such, non-subscribers may refrain from requesting connection to the network. In another case, the network may continue to transmit the indication and continue to receive connection requests from non-subscriber UEs, but the network may transmit rejection messages to each UE that requests connection. In some other cases, UEs may be configured or receive a configuration (e.g., a priority list of networks, a function for calculation of an access identity) that enables the UE to efficiently determine which network of a set of networks to request connection to, where the configuration is based on mitigating network overload of one or more networks.

Similarly, a base station may transmit, during a non-subscriber UE acceptance mode, an indication that a second network is available as a fallback network while a first network is unavailable, where the base station serves the second network. The base station may establish a connection with one or more UEs based on receiving registration messages from the one or more UEs in response to transmitting the indication. In some cases, the UEs may establish the connection with the second network based on a fallback configuration of the UE, as described herein. The base station may identify a congestion level of the second network and that the identified congestion level is equal to or greater than a congestion level threshold, and switch to a non-subscriber UE rejection mode in which the base station rejects connection with non-subscriber UEs (e.g., disaster inbound roamers). The switching may be based on the congestion level being equal to or greater than the congestion level threshold.

A method for wireless communications at a UE is described. The method may include identifying that the UE is not connected with a first network to which the UE subscribes, identifying a fallback configuration to be applied based on identifying that the UE is not connected with the first network, determining, based on the fallback configuration, a second network of one or more other networks with which the UE is to connect, the UE lacking a subscription to any of the one or more other networks, and attempting to connect with the second network based on the fallback configuration and the UE not being connected with the first network.

An apparatus for wireless communications at a UE is described. The apparatus may include a processor, memory coupled with the processor, and instructions stored in the memory. The instructions may be executable by the processor to cause the apparatus to identify that the UE is not connected with a first network to which the UE subscribes, identify a fallback configuration to be applied based on identifying that the UE is not connected with the first network, determine, based on the fallback configuration, a second network of one or more other networks with which the UE is to connect, the UE lacking a subscription to any of the one or more other networks, and attempt to connect with the second network based on the fallback configuration and the UE not being connected with the first network.

Another apparatus for wireless communications at a UE is described. The apparatus may include means for identifying that the UE is not connected with a first network to which the UE subscribes, means for identifying a fallback configuration to be applied based on identifying that the UE is not connected with the first network, means for determining, based on the fallback configuration, a second network of one or more other networks with which the UE is to connect, the UE lacking a subscription to any of the one or more other networks, and means for attempting to connect with the second network based on the fallback configuration and the UE not being connected with the first network.

A non-transitory computer-readable medium storing code for wireless communications at a UE is described. The code may include instructions executable by a processor to identify that the UE is not connected with a first network to which the UE subscribes, identify a fallback configuration to be applied based on identifying that the UE is not connected with the first network, determine, based on the fallback configuration, a second network of one or more other networks with which the UE is to connect, the UE lacking a subscription to any of the one or more other networks, and attempt to connect with the second network based on the fallback configuration and the UE not being connected with the first network.

In some examples of the method, apparatuses, and non-transitory computer-readable medium described herein, identifying the fallback configuration may include operations, features, means, or instructions for identifying a set of one or more networks that the UE may be allowed to switch to while the first network may be unavailable, the set of one or more networks arranged in a list based on a priority associated with each network.

In some examples of the method, apparatuses, and non-transitory computer-readable medium described herein, determining to connect with the second network may include operations, features, means, or instructions for identifying a network in the set of one or more networks associated with a highest priority, the second network associated with the highest priority and determining to establish a connection with the second network based on the second network being associated with the highest priority.

In some examples of the method, apparatuses, and non-transitory computer-readable medium described herein, determining to connect with the second network may include operations, features, means, or instructions for identifying, at a first time, a network in the set of one or more networks associated with a highest priority, the second network associated with the highest priority and determining, at a second time, to establish a connection with the second network based on the second network being associated with the highest priority, a duration between the first time and the second time being computed randomly within a configured range.

In some examples of the method, apparatuses, and non-transitory computer-readable medium described herein, the UE may be configured with the set of one or more networks, the set of one or more networks included in a data file of a Universal Mobile Telecommunications Service (UMTS) subscriber identify module (USIM) of the UE.

Some examples of the method, apparatuses, and non-transitory computer-readable medium described herein may further include operations, features, means, or instructions for receiving the set of one or more networks via over-the-air (OTA) via a UE parameter update procedure or a steering of roaming procedure.

Some examples of the method, apparatuses, and non-transitory computer-readable medium described herein may further include operations, features, means, or instructions for determining, based on the attempting, that the second network may be currently unavailable to the UE.

In some examples of the method, apparatuses, and non-transitory computer-readable medium described herein, attempting to connect with the second network may include operations, features, means, or instructions for monitoring for an indication, from the second network, that the second network may be available as a fallback network while the first network may be unavailable.

In some examples of the method, apparatuses, and non-transitory computer-readable medium described herein, determining that the second network may be currently unavailable to the UE may include operations, features, means, or instructions for determining that the indication may be absent in broadcasts from the second network.

In some examples of the method, apparatuses, and non-transitory computer-readable medium described herein, the UE monitors for the indication, from the second network, in a system information block (SIB).

In some examples of the method, apparatuses, and non-transitory computer-readable medium described herein, determining that the second network may be currently unavailable to the UE may include operations, features, means, or instructions for transmitting, to the second network, a registration message and receiving, from the second network and in response to the registration message, a rejection message with a rejection cause indication.

In some examples of the method, apparatuses, and non-transitory computer-readable medium described herein, the rejection message includes a back-off timer indicating a duration of time for the UE to refrain from attempting to establish a connection with the second network.

Some examples of the method, apparatuses, and non-transitory computer-readable medium described herein may further include operations, features, means, or instructions for transmitting, to the second network, a second registration message based on the back-off timer expiring.

Some examples of the method, apparatuses, and non-transitory computer-readable medium described herein may further include operations, features, means, or instructions for attempting to connect with one of the one or more other networks based on the determination that the second network may be currently unavailable to the UE.

A method for wireless communications at a UE is described. The method may include identifying that the UE is not connected with a first network to which the UE subscribes, identifying a fallback configuration to be applied based on identifying that the UE is not connected with the first network, determining, based on the fallback configuration, a second network of one or more other networks with which the UE is to connect, the UE lacking a subscription to any of the one or more other networks, and attempting to connect with the second network based on the fallback configuration and the UE not being connected with the first network.

An apparatus for wireless communications at a UE is described. The apparatus may include a processor, memory in electronic communication with the processor, and instructions stored in the memory. The instructions may be executable by the processor to cause the apparatus to identify that the UE is not connected with a first network to which the UE subscribes, identify a fallback configuration to be applied based on identifying that the UE is not connected with the first network, determine, based on the fallback configuration, a second network of one or more other networks with which the UE is to connect, the UE lacking a subscription to any of the one or more other networks, and attempt to connect with the second network based on the fallback configuration and the UE not being connected with the first network.

Another apparatus for wireless communications at a UE is described. The apparatus may include means for identifying that the UE is not connected with a first network to which the UE subscribes, means for identifying a fallback configuration to be applied based on identifying that the UE is not connected with the first network, means for determining, based on the fallback configuration, a second network of one or more other networks with which the UE is to connect, the UE lacking a subscription to any of the one or more other networks, and means for attempting to connect with the second network based on the fallback configuration and the UE not being connected with the first network.

A non-transitory computer-readable medium storing code for wireless communications at a UE is described. The code may include instructions executable by a processor to identify that the UE is not connected with a first network to which the UE subscribes, identify a fallback configuration to be applied based on identifying that the UE is not connected with the first network, determine, based on the fallback configuration, a second network of one or more other networks with which the UE is to connect, the UE lacking a subscription to any of the one or more other networks, and attempt to connect with the second network based on the fallback configuration and the UE not being connected with the first network.

Some examples of the method, apparatuses, and non-transitory computer-readable medium described herein may further include operations, features, means, or instructions for receiving a notification from the first network that service to the UE may be provided by the one or more other networks via UE roaming, where identifying the fallback configuration may be based on the notification from the first network.

In some examples of the method, apparatuses, and non-transitory computer-readable medium described herein, the notification from the first network indicates that the first network may be unavailable.

In some examples of the method, apparatuses, and non-transitory computer-readable medium described herein, identifying the fallback configuration may include operations, features, means, or instructions for identifying a set of networks that the UE may be allowed to switch to while the first network may be unavailable, the set of networks arranged in a list based on a priority associated with each network.

In some examples of the method, apparatuses, and non-transitory computer-readable medium described herein, determining to connect with the second network may include operations, features, means, or instructions for identifying a network in the set of networks associated with a highest priority, the second network associated with the highest priority and determining to establish a connection with the second network based on the second network being associated with the highest priority.

In some examples of the method, apparatuses, and non-transitory computer-readable medium described herein, determining to connect with the second network may include operations, features, means, or instructions for identifying, at a first time, a network in the set of networks associated with a highest priority, the second network associated with the highest priority and determining, at a second time, to establish a connection with the second network based on the second network being associated with the highest priority, a duration between the first time and the second time being computed randomly within a pre-configured range.

In some examples of the method, apparatuses, and non-transitory computer-readable medium described herein, the UE may be configured with the set of networks, the set of networks included in a data file of a Universal Mobile Telecommunications Service (UMTS) subscriber identify module (USIM) of the UE.

Some examples of the method, apparatuses, and non-transitory computer-readable medium described herein may further include operations, features, means, or instructions for receiving the set of networks via over-the-air (OTA) via a UE parameter update procedure or a steering of roaming procedure.

In some examples of the method, apparatuses, and non-transitory computer-readable medium described herein, receiving the notification from the first network may include operations, features, means, or instructions for receiving, from the first network, a deregistration message indicating to the UE to deregister from the first network.

In some examples of the method, apparatuses, and non-transitory computer-readable medium described herein, the deregistration message includes a set of networks arranged in a list based on a priority associated with each network or an identifier of a network with which the UE may be to connect, the UE determines to connect with the second network based on the deregistration message.

In some examples of the method, apparatuses, and non-transitory computer-readable medium described herein, identifying the fallback configuration may include operations, features, means, or instructions for identifying a function for the UE to use to determine an access identity for the UE to use to determine which network of the one or more other networks with which to connect and to connect to the determined network.

Some examples of the method, apparatuses, and non-transitory computer-readable medium described herein may further include operations, features, means, or instructions for calculating a value based on the function, the value indicating an access identity of a set of access identities, where each network may be associated with a particular access identity.

Some examples of the method, apparatuses, and non-transitory computer-readable medium described herein may further include operations, features, means, or instructions for determining one or more networks associated with the access identity indicated by the calculated value and determining to establish a connection with the second network based on the second network being associated with the access identity indicated by the calculated value.

Some examples of the method, apparatuses, and non-transitory computer-readable medium described herein may further include operations, features, means, or instructions for determining that there may be not a network available that may be associated with the access identity indicated by the calculated value and determining to connect with the second network of the one or more other networks, randomly, based on determining that there may be not a network available that may be associated with the access identity indicated by the calculated value.

A method for wireless communications at a UE is described. The method may include receiving a notification from a first network to which the UE subscribes that service to the UE is to be provided by one or more other networks via UE roaming, evaluating a second network of the one or more other networks for availability based on the notification from the first network, determining, based on the evaluation, that the second network is currently unavailable to the UE, and attempting to connect with one of the one or more other networks based on the determination that the second network is currently unavailable to the UE.

An apparatus for wireless communications at a UE is described. The apparatus may include a processor, memory in electronic communication with the processor, and instructions stored in the memory. The instructions may be executable by the processor to cause the apparatus to receive a notification from a first network to which the UE subscribes that service to the UE is to be provided by one or more other networks via UE roaming, evaluate a second network of the one or more other networks for availability based on the notification from the first network, determine, based on the evaluation, that the second network is currently unavailable to the UE, and attempt to connect with one of the one or more other networks based on the determination that the second network is currently unavailable to the UE.

Another apparatus for wireless communications at a UE is described. The apparatus may include means for receiving a notification from a first network to which the UE subscribes that service to the UE is to be provided by one or more other networks via UE roaming, means for evaluating a second network of the one or more other networks for availability based on the notification from the first network, means for determining, based on the evaluation, that the second network is currently unavailable to the UE, and means for attempting to connect with one of the one or more other networks based on the determination that the second network is currently unavailable to the UE.

A non-transitory computer-readable medium storing code for wireless communications at a UE is described. The code may include instructions executable by a processor to receive a notification from a first network to which the UE subscribes that service to the UE is to be provided by one or more other networks via UE roaming, evaluate a second network of the one or more other networks for availability based on the notification from the first network, determine, based on the evaluation, that the second network is currently unavailable to the UE, and attempt to connect with one of the one or more other networks based on the determination that the second network is currently unavailable to the UE.

In some examples of the method, apparatuses, and non-transitory computer-readable medium described herein, evaluating the second network of the one or more other networks for availability may include operations, features, means, or instructions for monitoring for an indication, from the second network, that the second network may be available as a fallback network while the first network may be unavailable.

In some examples of the method, apparatuses, and non-transitory computer-readable medium described herein, determining that the second network may be currently unavailable to the UE may include operations, features, means, or instructions for determining that the indication may be absent in broadcasts from the second network.

In some examples of the method, apparatuses, and non-transitory computer-readable medium described herein, determining that the second network may be currently unavailable to the UE may include operations, features, means, or instructions for transmitting, to the second network, a registration message and receiving, from the second network and in response to the registration message, a rejection message with a rejection cause indication.

In some examples of the method, apparatuses, and non-transitory computer-readable medium described herein, the rejection cause indication indicates that the UE may be to attempt connection with a different network than the second network of the one or more other networks.

In some examples of the method, apparatuses, and non-transitory computer-readable medium described herein, attempting to connect with one of the one or more other networks may include operations, features, means, or instructions for attempting to connect with a third network of the one or more other networks based on the UE receiving the rejection cause indication from the second network.

In some examples of the method, apparatuses, and non-transitory computer-readable medium described herein, the rejection message includes a back-off timer indicating a duration of time for the UE to refrain from attempting to establish a connection with the second network.

In some examples of the method, apparatuses, and non-transitory computer-readable medium described herein, attempting to connect with the one of the one or more other networks may include operations, features, means, or instructions for transmitting, to the second network, a second registration message based on the back-off timer expiring.

In some examples of the method, apparatuses, and non-transitory computer-readable medium described herein, the UE monitors for the indication, from the second network, in a system information block (SIB).

A method for wireless communications at a base station is described. The method may include transmitting, during a non-subscriber UE acceptance mode, an indication that a second network is available as a fallback network while a first network is unavailable, the base station serving the second network, establishing a connection with one or more UEs based on receiving registration messages from the one or more UEs in response to transmitting the indication, identifying a congestion level of the second network and that the identified congestion level is equal to or greater than a congestion level threshold, and switching from the non-subscriber UE acceptance mode to a non-subscriber UE rejection mode in which the base station rejects connection with non-subscriber UEs, the switching based on the congestion level being equal to or greater than the congestion level threshold.

An apparatus for wireless communications at a base station is described. The apparatus may include a processor, memory in electronic communication with the processor, and instructions stored in the memory. The instructions may be executable by the processor to cause the apparatus to transmit, during a non-subscriber UE acceptance mode, an indication that a second network is available as a fallback network while a first network is unavailable, the base station serving the second network, establish a connection with one or more UEs based on receiving registration messages from the one or more UEs in response to transmitting the indication, identify a congestion level of the second network and that the identified congestion level is equal to or greater than a congestion level threshold, and switch from the non-subscriber UE acceptance mode to a non-subscriber UE rejection mode in which the base station rejects connection with non-subscriber UEs, the switching based on the congestion level being equal to or greater than the congestion level threshold.

Another apparatus for wireless communications at a base station is described. The apparatus may include means for transmitting, during a non-subscriber UE acceptance mode, an indication that a second network is available as a fallback network while a first network is unavailable, the base station serving the second network, means for establishing a connection with one or more UEs based on receiving registration messages from the one or more UEs in response to transmitting the indication, means for identifying a congestion level of the second network and that the identified congestion level is equal to or greater than a congestion level threshold, and means for switching from the non-subscriber UE acceptance mode to a non-sub scriber UE rejection mode in which the base station rejects connection with non-subscriber UEs, the switching based on the congestion level being equal to or greater than the congestion level threshold.

A non-transitory computer-readable medium storing code for wireless communications at a base station is described. The code may include instructions executable by a processor to transmit, during a non-subscriber UE acceptance mode, an indication that a second network is available as a fallback network while a first network is unavailable, the base station serving the second network, establish a connection with one or more UEs based on receiving registration messages from the one or more UEs in response to transmitting the indication, identify a congestion level of the second network and that the identified congestion level is equal to or greater than a congestion level threshold, and switch from the non-subscriber UE acceptance mode to a non-subscriber UE rejection mode in which the base station rejects connection with non-subscriber UEs, the switching based on the congestion level being equal to or greater than the congestion level threshold.

In some examples of the method, apparatuses, and non-transitory computer-readable medium described herein, identifying the congestion level of the second network may include operations, features, means, or instructions for receiving a message from an access and mobility management function (AMF) of the base station indicating the base station to switch to the non-subscriber UE rejection mode.

In some examples of the method, apparatuses, and non-transitory computer-readable medium described herein, the base station refrains from transmitting the indication that the second network may be available as a fallback network.

Some examples of the method, apparatuses, and non-transitory computer-readable medium described herein may further include operations, features, means, or instructions for transmitting, during the non-subscriber UE rejection mode, the indication that the second network may be available as a fallback network while the first network may be unavailable, receiving registration messages from the one or more UEs in response to transmitting the indication, and transmitting, to the one or more UEs, a rejection message with a rejection cause indication.

In some examples of the method, apparatuses, and non-transitory computer-readable medium described herein, the rejection message includes an indication for each of the one or more UEs to attempt connection with a different network than the second network.

In some examples of the method, apparatuses, and non-transitory computer-readable medium described herein, the rejection message includes a back-off timer indicating a duration of time for each of the one or more UEs to refrain from attempting to establish connection with the second network.

Some examples of the method, apparatuses, and non-transitory computer-readable medium described herein may further include operations, features, means, or instructions for receiving, from one or more of the one or more UEs, a second registration message based on the back-off timer expiring.

Some examples of the method, apparatuses, and non-transitory computer-readable medium described herein may further include operations, features, means, or instructions for receiving a notification that the first network to which one or more UEs subscribe may be unavailable and that the one or more UEs may be to attempt to connect with one or more other networks via roaming.

Some examples of the method, apparatuses, and non-transitory computer-readable medium described herein may further include operations, features, means, or instructions for transmitting the indication during the non-subscriber UE acceptance mode may be based on receiving the notification that the first network to which one or more UEs subscribe may be unavailable.

DETAILED DESCRIPTION

Figure 1:
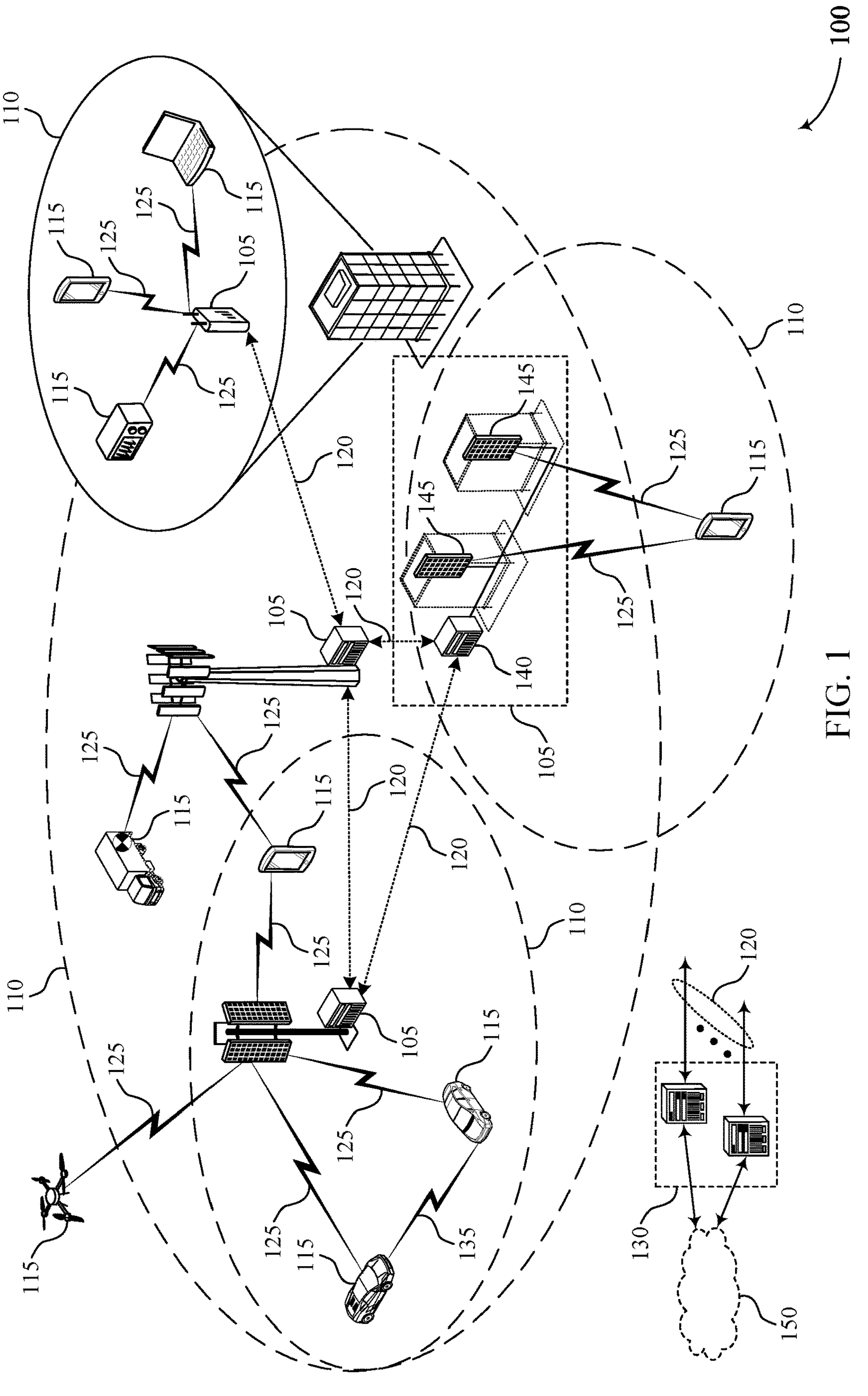
FIG. 1 illustrates an example of a wireless communications system that supports techniques for performing a network switching operation in accordance with aspects of the present disclosure.

In some wireless communications systems, a user equipment (UE) may be a subscriber to a network (e.g., an operator, public land mobile network (PLMN)) such that the network may provide service to the UE. A network may serve a set of UEs including any number of UEs. In some cases, a network may be unable to provide service to UEs within all or a portion of a coverage area. For example, a disaster (e.g., natural disaster, man-made disaster) may impact the network's ability to serve UEs subscribed to the network. In another example, an operator may not provide sufficient or any coverage within an area (for example, in a rural area). In either case, UEs affiliated with the network may be temporarily unable to connect with the network and may be without service (e.g., disaster inbound roamers). In some implementations, in the event that a network is unable to provide service to UEs subscribed to the network, UEs of the network may be notified and the UEs may attempt to obtain service from other networks available in the same location. Such techniques may be referred to as minimization of service interruption (MINT) techniques.

However, in some cases, such as in disaster scenarios where a network may be unable to provide service to a large number of UEs within at least one area, the large number of UEs may attempt to switch to the other networks in the location unaffected by the disaster. As a large number of UEs may attempt to register with the unaffected networks, one or more of the unaffected networks may become overloaded with new UEs (e.g., non-subscriber UEs, disaster inbound roamers) and may not be able to serve all UEs attempting to gain access.

To ensure that the failure of one network does not lead to congestion and signaling overload in other networks (that have not failed), UEs and/or networks (or network devices, such as base stations) may be configured with procedures to support efficient operator switching techniques. A base station of an unaffected network may broadcast a signal that indicates that the base station is able to accept UEs that are roaming as a result of the disaster (or some other condition). The UEs (e.g., disaster inbound roamers) may attempt to join the network when the signal is being broadcast. In some cases, when the unaffected network becomes congested, the network may refrain from broadcasting the signal so that UEs refrain from requesting access to the network. In some cases, a congested network may continue to transmit the indication and UEs may continue to attempt to connect with the congested network, but upon the attempt, the congested network may transmit a registration rejection message to each UE that attempts to connect to the congested network. In some implementations, the rejected UEs may be directed to connect to a different network, or the UEs may wait for a duration before attempting to connect with the same network. In some other implementations, a UE may be configured with a set of fallback networks to which the UE may connect in the event of a disaster that affects the network the UE is subscribed to or in the event that the UE is otherwise without service. The set of fallback networks may be indicated as a list of networks ranked by priority, where the UE may attempt to connect with the network associated with the highest priority first. The UE may also randomly stagger its attempts to connect to the list of networks within a pre-configured range such that multiple UEs do not all attempt access at a same time.

In some cases, multiple access identities may be configured for disaster conditions or other conditions in which a UE is unable to receive service from its serving network. The UE may be configured with a function (e.g., a hash function) that the UE may use to calculate an access identity the UE may then use to connect with a network. The access identity may correspond with a specific network the UE is allowed to join. The hash function may be selected to ensure that the roaming UEs (e.g., disaster inbound roamers) are well-distributed across available networks. Any of the described cases may be used in any combination with one another to ensure that the failure of one network does not lead to congestion and signaling overload in other, unaffected networks.

Particular aspects of the subject matter described herein may be implemented to realize one or more advantages. The described techniques may support improvements in network switching procedures performed by roaming UEs by mitigating network congestion, improving reliability, and improving efficiency, among other advantages. As such, supported techniques may include improved network operations and, in some examples, may promote network efficiencies, among other benefits.

Aspects of the disclosure are initially described in the context of wireless communications systems. Aspects are then described with respect to process flows. Aspects of the disclosure are further illustrated by and described with reference to apparatus diagrams, system diagrams, and flowcharts that relate to techniques for performing a network switching operation.

FIG. 1 illustrates an example of a wireless communications system 100 that supports techniques for performing a network switching operation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

As described herein, in some cases, a network may be unable to provide service to one or more UEs 115 served by the network in one or more locations such as due to disaster. In some cases, UEs 115 without service (e.g., disaster inbound roamers) may be configured to request access to other networks in the area. To ensure that the failure of one network does not lead to congestion and signaling overload in other networks (that have not failed), UEs 115 and/or networks (or network devices, such as base stations 105) may be configured with procedures to support efficient operator switching techniques. A base station 105 of an unaffected network may broadcast a signal that indicates that the base station is able to accept UEs 115 that are roaming as a result of the disaster (or some other condition). The UEs 115 (e.g., disaster inbound roamers) may attempt to join the network when the signal is being broadcast. In some cases, when the unaffected network becomes congested, the network may refrain from broadcasting the signal so that UEs 115 refrain from requesting access to the network. In some cases, a congested network may continue to transmit the indication and UEs 115 may continue to attempt to connect with the congested network, but upon the attempt, the congested network may transmit a registration rejection message to each UE 115 that attempts to connect to the congested network. In some implementations, the rejected UEs 115 may be directed to connect to a different network, or the UEs 115 may wait for a duration before attempting to connect with the same network.

In some other implementations, a UE 115 may be configured with a set of fallback networks to which the UE 115 may connect in the event of a disaster that affects the network the UE 115 is subscribed to or in the event that the UE 115 is otherwise without service. The set of fallback networks may be indicated as a list of networks ranked by priority, where the UE 115 may attempt to connect with the network associated with the highest priority first. The UE 115 may also randomly stagger its attempts to connect to the list of networks within a pre-configured range such that multiple UEs do not all attempt access at a same time. In some cases, multiple access identities may be configured for disaster conditions or other conditions in which a UE 115 is unable to receive service from its serving network. The UE 115 may be configured with a function (e.g., a hash function) that the UE 115 may use to calculate an access identity the UE 115 may then use to connect with a network. The access identity may correspond with specific network the UE 115 is allowed to join. The hash function may be selected to ensure that the roaming UEs 115 (e.g., disaster inbound roamers) are well-distributed across available networks. Any of the described cases may be used in any combination with one another to ensure that the failure of one network does not lead to congestion and signaling overload in other, unaffected networks.

Figure 2:
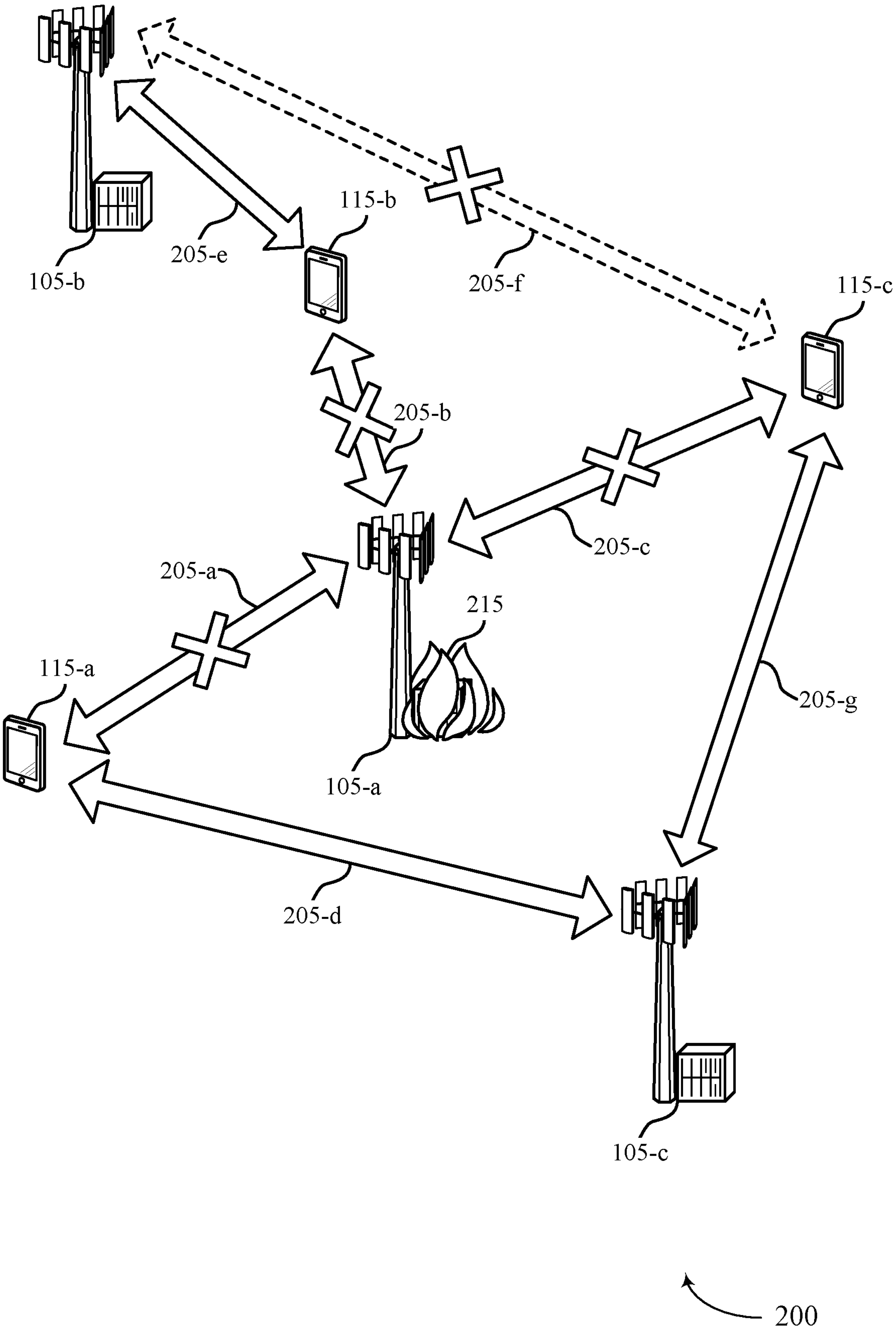
FIG. 2 illustrates an example of a wireless communications system that supports techniques for performing a network switching operation in accordance with aspects of the present disclosure.

FIG. 2 illustrates an example of a wireless communications system 200 that supports techniques for performing a network switching operation in accordance with aspects of the present disclosure. The wireless communications system 200 may include base stations 105-*a*, 105-*b*, and 105-*c* and UEs 115-*a*, 115-*b*, and 115-*c*, which may be examples of a base station 105 and UEs 115 as described with reference to FIG. 1. Each base station 105 may serve a geographic coverage area, where the coverage areas may be the same, may overlap, or may be different. In some cases, UEs 115-*a*, 115-*b*, 115-*c* and/or base stations 105-*a*, 105-*b*, and 105-*c* may implement network switching procedures that mitigate overloading a network.

In some wireless communications systems, a UE 115 may be a subscriber to a network (e.g., an operator, PLMN) such that the network may provide service to the UE 115. A network may serve a set of UEs 115, including any number of UEs 115. For example, base station 105-*a* may be a device that serves a first network, base station 105-*b* may be a device that serves a second network, and base station 105-*c* may be a device that serves a third network. UEs 115-*a*, 115-*b*, and 115-*c* may each be a subscriber to the first network and may be connected to the first network via base station 105-*a* such that base station 105-*a* provides service to each of UEs 115-*a*, 115-*b*, and 115-*c* associated with the first network. In some cases, each network may include multiple base stations 105, or network devices, where the multiple base stations may be located in different areas. For example, a network may serve subscriber UEs 115 within a main coverage area such as within a country. To reach UEs 115 around the country, one or more base stations 105 associated with the network may be placed throughout the country, where each of the one or more base station 105 may serve a coverage area that is smaller than the main coverage area and within the main coverage area. Subscriber UEs 115 in the main coverage area may connect with one of the one or more base stations 105 to receive service from the network based on the location of the UE 115 and the base stations 105 surrounding the UE 115 that are associated with the network.

In some cases, a network may be unable to provide service to UEs 115 within all or a portion of the main coverage area. In some cases, a disaster condition (e.g., natural disaster, man-made disaster) such as a fire, earthquake, hurricane, etc. may impact the networks ability to serve UEs 115 in one or more areas. For example, a fire may impact one or more buildings or structures of the network (e.g., a control center, a building including the core network, base stations 105) that may impact the ability of the network to provide service to one or more UEs 115 in the location that the fire occurred. For example, a fire may impact one or more base stations 105 in one part of the country, as such, UEs 115 connected to the impacted base stations 105 in that part of the country may be without service (e.g., disaster inbound roamers) while UEs 115 in a different part of the country may continue to receive service from the network via base stations 105 unaffected by the fire. In another case, a network may not provide sufficient or any coverage within an area of the main coverage area (e.g., within the country), such as in a rural area. As such, any UE 115 that subscribes to the network and that moves into the area of limited or no coverage may not be able to receive service form the network.

In some implementations, in the event that a network is unable to provide service to UEs 115 subscribed to the network, UEs 115 of the network may be notified and the UEs 115 may attempt to obtain service from other networks available in the same location. Such techniques may be referred to as MINT techniques. For example, UEs 115-*a*, 115-*b*, and 115-*c* may each be a subscriber to the first network and may be connected to the first network through base station 105-*a*. UE 115-*a* may communicate with base station 105-*a* via communication link 205-*a*, UE 115-*b* may communicate with base station 105-*a* via communication link 205-*b*, and UE 115-*c* may communicate with base station 105-*a* via communication link 205-*c*, where communication links 205-*a*, 205-*b*, and 205-*c* may each be used as an uplink communications link or a downlink communications link. A disaster condition may occur, such as a fire 215, which may impact that ability of base station 105-*a* to provide service to UEs 115-*a*, 115-*b*, and 115-*c*. As such, UEs 115-*a*, 115-*b*, and 115-*c* may be unable to communicate with base station 105-*a* via communication links 205. In some cases, no other base station 105 associated with the first network may be located in the same area so UEs 115-*a*, 115-*b*, and 115-*c* and may be without service for a duration of time. In such cases, UEs 115-*a*, 115-*b*, and 115-*c* may be notified from base station 105-*a*, or a neighboring base station 105 such as a base station 105 associated with another network (e.g., base station 105-*b*, or 105-*c*) that UEs 115-*a*, 115-*b*, and 115-*c* may be unable to receive service from the first network and may attempt to obtain service from other networks available in the same location. A same location may be defined as an area, perimeter, or some other distance is relation to a UE 115 (e.g., UE 115-*a*, UE 115-*b*, UE 115-*c*) or base station 105 (e.g., base station 105-*a*).

In such cases, UEs 115 that received the notification may attempt to register with one or more other networks in the same location. An access identity may be associated with disaster conditions (e.g., access identity 3 associated with UE for which disaster condition applies). As such, each of the UEs 115 may use the disaster condition access identity to attempt to register with a new network. In some disaster conditions, networks unaffected by the disaster may be configured to transmit an indication to UEs 115 via a broadcast message (e.g., a system information block (SIB) flag) that the network may accept UEs 115 impacted by the disaster (e.g., disaster inbound roamers). For example, unaffected networks located in the same area as the affected network may be notified (by an entity of the affected network, or an entity of its own network) that a disaster impacted the first network and to transmit the indication. As such, each of the UEs 115 impacted by the disaster may monitor for the indication from one or more networks and attempt to register (e.g., transmit a registration request message) with one or more networks from which the UE 115 received an indication from. A network, or a network device (e.g., a base station 105) may receive a registration request from one or more UEs 115 and accept the registration request such that each of the UEs 115 may register and connect with the network.

However, in some cases, such as in disaster scenarios where a network may be unable to provide service to a large number of UEs 115 (e.g., tens of UEs 115, hundreds of UEs 115, thousands of UEs 115) within at least one area, the large number of UEs 115 may attempt to switch to the other networks in the location unaffected by the disaster. As a large number of UEs 115 may attempt to register with the unaffected networks, one or more of the unaffected networks may become overloaded with new UEs 115 (e.g., non-subscriber UEs 115, disaster inbound roamers) and may not be able to serve all UEs 115 attempting to gain access. For example, UEs 115-*a*, 115-*b*, and 115-*c* may each receive a notification that the first network is unable to provide service to each of the UEs 115, and each of the UEs 115 may monitor for the indications from base station 105-*b* (of the second network) and/or base station 105-*c* (of the third network). In some cases, all three of the UEs 115 may determine to attempt connection with base station 105-*b*, and in some cases, may be able to connect with base station 105-*b* which may, in some scenarios, overload base station 105-*b* and base station 105-*b* may not be able to efficiently or reliably serve the UEs 115 connected to base station 105-*b*, or accept any additional UEs 115.

To ensure that the failure of one network does not lead to congestion and signaling overload in other networks (that have not failed), UEs 115 and/or networks (or network devices, such as a base station) may be configured with procedures to support efficient network switching techniques. The efficient network switching techniques described herein may be implemented in disaster conditions in which one or more networks are impacted by a disaster, or in some other scenario in which a network in unable to provide service to its subscriber UEs 115. In some cases, the network switching techniques may include a network or a network device such as a base station 105, determining that the network as a whole or in a certain one or more locations has become congested (e.g., overloaded). For example, the unaffected network as a whole may have accepted a large number of UEs 115 in one or more locations (via one or more base stations 105) and the network as a whole has become overloaded. In another example, the network in a certain location may have accepted a large number of UEs 115 (via one or more base station 105) and has become overloaded in that certain location. The determination that the whole network or the network in a certain one or more location has become overloaded may be determined by the network or by a device of the network, such as a base station 105 that has become overloaded in a certain location.

Upon determining that a network as a whole or a network in a certain location has become overloaded, the network may determine to refrain from transmitting (e.g., via the broadcast SIB flag) the indication that the network is accepting impacted UEs 115 as a whole, or at a certain overloaded location. For example, as described herein, base station 105-*b* may be overloaded or may be near to becoming overloaded. As such, the second network and/or base station 105-*b* may determine to refrain from transmitting the indication that base station 105-*b* is able to accept impacted UEs 115. As such, impacted UEs 115 monitoring for the indications may not receive one from base station 105-*b* and thus may not attempt to connect with base station 105-*b*. In some cases, a threshold may be defined that is used to determine whether a network, or a network in a certain location is overloaded. The threshold may be a number of UEs 115 connected to the network in a certain area, a quality of service, an amount of resources being used by the network in a certain location, etc. For example, if the network determines that the network, or the network in a certain location is below the threshold, the network or the network in the certain location may remain in a UE acceptance mode (e.g., non-subscriber UE acceptance mode) in which the network may continue to transmit the broadcasted indication and continue to allow UEs 115 to connect with the network. In another example, if the network determines that the network, or the network in a certain location is equal to or above the threshold, the network or the network in the certain location may switch modes to UE rejection mode (e.g., a non-subscriber UE rejection mode) in which the network may refrain from transmitting the indication and refrain from accepting new UEs 115 to connect with the network.

In some cases, a core function (or element of the core network) of a network may determine that the network should stop transmitting the indication and trigger the network to stop. For example, the network may determine that the network has reached an overload condition in a least on location and an AMF (e.g., an element of the core network that is associated with registration requests) of the network may transmit a message (e.g., and overload start message) to each network device that has reached the overload condition. For example, the second network may determine that base station 105-*b* has reached an overload condition. The AMF of the second network may transmit the overload message to base station 105-*b* to indicate that base station 105-*b* has reached an overload condition. In some cases, the AMF may include in the overload message an information element (IE) that indicates an overload response (e.g., an overload response IE) that may include an overload action IE. The overload action IE may be set to a value (e.g., a new value) that indicates that base station 105-*b* should reject at least non-subscriber UEs 115 (e.g., the overload action IE may indicate to reject radio resource control (RRC) connection establishments for disaster inbound roamers). The overload message from the AMF may trigger the base station 105 to enter the UE rejection mode. As a result of receiving the overload message from the AMF, base station 105-*b* refrain from transmitting the indication. A network may enter into a UE rejection mode and turn off the indication (e.g., refrain from transmitting the indication) on a per cell basis such that the network may target certain areas which are congested. For example, base station 105-*b* may be the only congested node (e.g., radio access network (RAN) node) or area within the second network. As such, rather than turning of the indication across the whole network, the second network may target base station 105-*b* and turn off the indication at just base station 105-*b*.

In some cases, upon determining that a network as a whole or a network in a certain location has become overloaded, such as based on the threshold as described herein, the network may enter the UE rejection mode but may continue to transmit the indication and receive registration requests from non-subscriber UEs 115. While operating in the UE rejection mode, the network or a network device (e.g., a base station 105) may reject registration requests (from disaster inbound roamers). To reject the registration requests, the network may transmit a registration reject message to each of the UEs 115 from which the network receives a registration request from, where again, the UE rejection mode may be implemented throughout a whole network or in certain location, such as at certain congested base stations 105. In some cases, the registration reject message may indicate a cause value (e.g., an 5GMM existing cause value), a back-off timer, or both. The cause value may indicate to the UE 115 that received the rejection that the base station 105 is unable to accept the UEs 115 registration request because the base station 105 is overloaded, or near overloaded. The back-off timer may indicate a duration of time (e.g., as a number of slots, symbols, TTIs, etc. or a duration of time in milliseconds, seconds, minutes, etc.) the each of the UEs 115 that receive the rejection are to refrain from attempting to register with the network. The duration of time indicated by the back-off timer may be preconfigured, or determined semi-statically or dynamically by the network or a network device (e.g., a base station 105). Upon receiving the registration rejection message including the cause value and the back-off timer, the UE 115 may attempt to register with a different network, or may wait until the expiry of the back-off timer and attempt to register with the same network by re-transmitting a registration request message. If the network entered into a UE acceptance mode while the back-off timer was running, then upon receiving the re-transmitted registration request from the UE 115, the network may accept the UEs registration request. However, if the network remains congested after the expiration of the timer, the network may again transmit the registration reject message including the cause value, the back-off timer, or both.

In some cases, the registration reject message may indicate a cause value (e.g., a new 5GMM cause value) that indicates that a UE 115 should look for service in another network that is able to accept non-subscriber UEs 115 (e.g., disaster inbound roamers). As such, upon receiving the registration reject message from a second network, a UE 115 may monitor for broadcast indications from other networks, such as a third network, and attempt to register with the third network based on receiving the registration reject message from the second network and based on receiving a broadcast indication from the third network.

In some cases, a network may use a combination of the registration rejection messages. For example, upon entering a UE rejection mode, a network may be configured to first transmit the registration rejection message that includes the cause value and the back-off timer. Then if the network receives a second registration message from a same UE 115 and the network is still in the UE rejection mode, then the network may transmit the registration rejection message that indicates that the UE 115 should look for another network to connect with. As described herein, a network may enter a UE rejection mode and transmit registration reject messages on a per cell basis such that the network may target certain areas which are congested. For example, base station 105-*b* may be the only congested node (e.g., RAN node) or area within the second network. As such, rather than entering into a UE rejection mode across the whole network, the second network may target base station 105-*b* and instruct base station 105-*b* to enter the registration rejection mode.

In some implementations, UEs 115 may be configured with a set of networks (e.g., a set of network IDs such as PLMN IDs) that the UE 115 may attempt to establish a connection with, in the case that the network provider of the UE 115 is impacted by a disaster, or is otherwise unable to provide service to the UE 115. In some cases, networks may perform negotiations to determine service level agreements (SLAs) that determine which networks are included in the set of networks for each UE 115. As such, subscribers of a network (e.g., UEs 115) may be provisioned by the network the UEs 115 are subscribed to with the set of networks based on SLAs. In some cases, the set of networks may be configured in a prioritized list, that indicates a priority associated with each network in the list. In some cases, UEs 115 may be configured to utilize the set of networks in the case of a disaster condition, or in some other condition in which a UE 115 is unable to receive service from its network. In such a cases, a UE 115 may utilize the set of networks, or the prioritized list of networks to determine which network to transmit a registration request message to.

In some cases, UEs 115 may be preconfigured with the set of networks. For example, the set of networks may be included in a Universal Mobile Telecommunications Service (UMTS) subscriber identify module (USIM) of a UE 115 such as in a USIM data file. The set of networks may be stored in a USIM data file associated with storing information for disaster conditions (e.g., a new USIM data file, such as a disaster inbound roaming PLMN selector data file). In some cases, the set of networks may be stored in a USIM data file associated with network selection (e.g., an existing USIM data file, such as operator controlled PLMN Selector with Access Technology data file). In some implementations, UEs 115 may be provisioned with the set of networks via an over-the-air (OTA) transmission. For example, the network provider of a UE 115 may transmit an indication of the set of networks via a UE parameters update procedure in which UE parameters in the ME or USIM are updated. As such, the UE parameters update procedure may be used to further configure the UE 115 with the set of networks or update the set of networks the UE 115 may use in a disaster condition. In another example, the network of a UE 115 may transmit an indication of the set of networks via a steering of roaming procedure in which a list of networks (e.g., preferred PLMNs) at the UE 115 may be updated. As such, the steering of roaming procedure may be used to further configure the UE 115 with the set of networks or update the set of networks the UE 115 may use in a disaster condition.

In some implementations, a network subject to disaster may redirect the UEs 115 served by the network to a specific network (e.g., a PLMN ID) or provide the UEs 115 with the set of networks (e.g., the prioritized list of networks) when a disaster condition applies. A network may determine that the network is currently in or about to enter a disaster condition and upon this determination may transmit a deregistration message to its subscribing UEs 115. The deregistration request message may include a cause value (e.g., a new 5GMM cause value) and an IE (e.g., a new IE). The deregistration request may include the specific PLMN ID or the prioritized list of networks (e.g., list of PLMN IDs).

In the case that a UE 115 is configured with a set of networks, upon entering into a disaster condition (or some other condition in which the UE 115 is unable to receive service), the UE 115 may use the set to determine which network to attempt to connect to. In the case that a UE 115 is configured with a list of prioritized networks, upon entering into a disaster condition (or some other condition in which the UE 115 is unable to receive service), the UE 115 may first attempt to connect with the network associated with the highest priority in the list. If the UE 115 is unable to connect to the network associated with the highest priority, the UE 115 may attempt to connect with the next highest priority in this list, and so on until the UE 115 is able to connect with a network, or until the UE 115 reaches the end of the list. The UE 115 may also stagger its attempts to connect to the list of networks such that multiple UEs do not all attempt access at a same time. The UE 115 may be configured to treat each network in the set of networks as equivalent to the original network of the UE 115.

As described herein, a single access identity may be associated with disaster conditions. In some cases, multiple access identities may be defined and associated with a disaster condition. To determine which access identity a UE 115 should use in a disaster condition, a UE 115 may be configured with a function (e.g., a hash function) that the UE 115 may use to calculate a value associated with an access identity. A hash function may be any function that may be used to map data of some size to fixed values. The UE 115 may be configured to apply the hash function the UE 115 is configured with to the international mobile subscriber identity (IMSI) of the UE 115, while in a disaster condition (or some other condition), or prior to a disaster condition. The output of the hash function may be a value that may correspond to a disaster condition access identity. The UE 115 may identify the access identity associated with the output of the hash function and use that access identity to determine which network to connect to and to connect with the determined network.

For example, each network may include a barring bitmap associated with access control to UEs 115. Each network located in the same location as the disaster may set the barring bitmap for one or more of these access identities to on, such as one of the disaster condition access identities, and the barring bitmap for the rest of the access identities to off. Which access identities are set to on by a network may be pre-determined (e.g., pre-negotiated between networks). In some cases, which access identities are set to on by a network may be communicated (e.g., dynamically communicated) to the network by an external entity informing the networks that a disaster condition applies. Each network in an area, serving UEs 115 impacted by a disaster, may be associated with a different access identity and the hash functions of UEs 115 may be configured such that UEs 115 are distributed across the available access identities and thus distributed across the available networks so as to distribute the load of non-subscriber UEs 115 (e.g., disaster inbound roamers) amongst available networks unaffected by the disaster. For example, the hash function may sort out subscribers (e.g., UEs 115) into x groups, where x may be determined based on the number of networks in the location in which the disaster occurred.

A UE 115 may determine that the UE 115 is unable to connect with base station 105-*a*, and may then determine which of one or more available networks the UE 115 is to attempt to join. A UE 115 may be configured to determine one of the disaster condition access identities based on the hash function, and thus may determine which network to attempt to connect to in a disaster condition. To determine which access identity a network is associated with, a UE 115 may check the barring bitmap of a network. If the barring bitmap for the access identity that the UE 115 calculated is set to on, the UE 115 may attempt to register with the network. If the barring bitmap for the access identity the UE 115 calculated is set to off, then the UE may look to a next network to determine the access identity of the network (based on the barring bitmap of the network). If the UE 115 is unable to find a network with a matching access identity that is set to on (for example, because the network associated with that access identity is not available in the UEs location), then the UE 115 may randomly select a network among the available networks in the UEs 115 location accepting non-subscriber UEs 115 (e.g., disaster inbound roamers) and may attempt to register with the randomly selected network.

In some implementations, a UE 115 may be configured with a duration of time for which the UE 115 is to wait before attempting to establish a connection with a network. Each UE 115 of a network may be assigned a different duration, or UEs 115 may be divided into subsets and each subset may be assigned a different duration so as to space out the number of UEs 115 that attempt to connect to a network at one time. The duration may be a duration of time (e.g., as a number of slots, symbols, TTIs, etc. or a duration of time in milliseconds, seconds, minutes, etc.) after the UE 115 determines that the UE 115 is unable to receive service from its network before the UE 115 may attempt to connect with a different network. The duration may be computed randomly within a pre-configured range.

Any of the solutions described herein may be used in any combination with one another to ensure that the failure of one network does not lead to congestion and signaling overload in other, unaffected networks. For example, UEs 115-*a*, 115-*b*, and 115-*c* may receive a notification or otherwise determine that the first network served by base station 105-*a* is unavailable to provide service to UEs 115-*a*, 115-*b*, and 115-*c*. In some cases, the UEs 115 may each be configured with a set of networks (e.g., a priority list of networks) the UEs 115 may attempt to connect to, or the UEs 115 may be configured with a function to use for determining an access identity to use to connect with a network, or a combination thereof. Additionally or alternatively, each of the UEs 115 may be configured to monitor for broadcast indications (e.g., via a SIB flag) from networks that are accepting non-subscriber UEs 115 (e.g., disaster inbound roamers). As such, UEs 115-*a*, 115-*b*, and 115-*c* may each determine a network to attempt to connect to based on a received indication from a network, a priority list, a calculated access identity, or a combination thereof.

For example, UE 115-*a* may determine and attempt to connect to the third network via base station 105-*c* by transmitting a registration request message to base station 105-*c*. Base station 105-*c* may not be overloaded and may accept the registration request message, so as to allow UE 115-*a* to connect to base station 105-*c* to receive service from base station 105-*c* via communications link 205-*d*. Similarly, UE 115-*b* may determine and attempt to connect to the second network via base station 105-*b* by transmitting a registration request message to base station 105-*b*. Base station 105-*b* may not be overloaded and may accept the registration request message, so as to allow UE 115-*b* to connect to base station 105-*b* to receive service from base station 105-*b* via communications link 205-*e*. UE 115-*c* may first determine to connect to the second network via base station 105-*b* by transmitting a registration request message to base station 105-*b*. However, base station 105-*b* may have become overloaded and may have switched to a UE rejection mode. As such, base station 105-*b* may transmit a registration reject message to UE 115-*c*, and UE 115-*c* may be unable to form communication link 205-*f* with base station 105-*b* at that time based on the rejection. Based on the information included in the registration reject message, UE 115-*c* may wait a duration before attempting to connect with base station 105-*b* again (e.g., a based on a back-off timer included in the registration reject message) or UE 115-*c* may be directed to the third network. For example, the registration reject message may direct UE 115-*c* to connect with the third network via base station 105-*c*. UE 115-*c* may transmit a registration request message to base station 105-*c*. Base station 105-*c* may not be overloaded and may accept the registration request message, so as to allow UE 115-*c* to connect to base station 105-*c* to receive service from base station 105-*c* via communications link 205-*g*.

Figure 3:
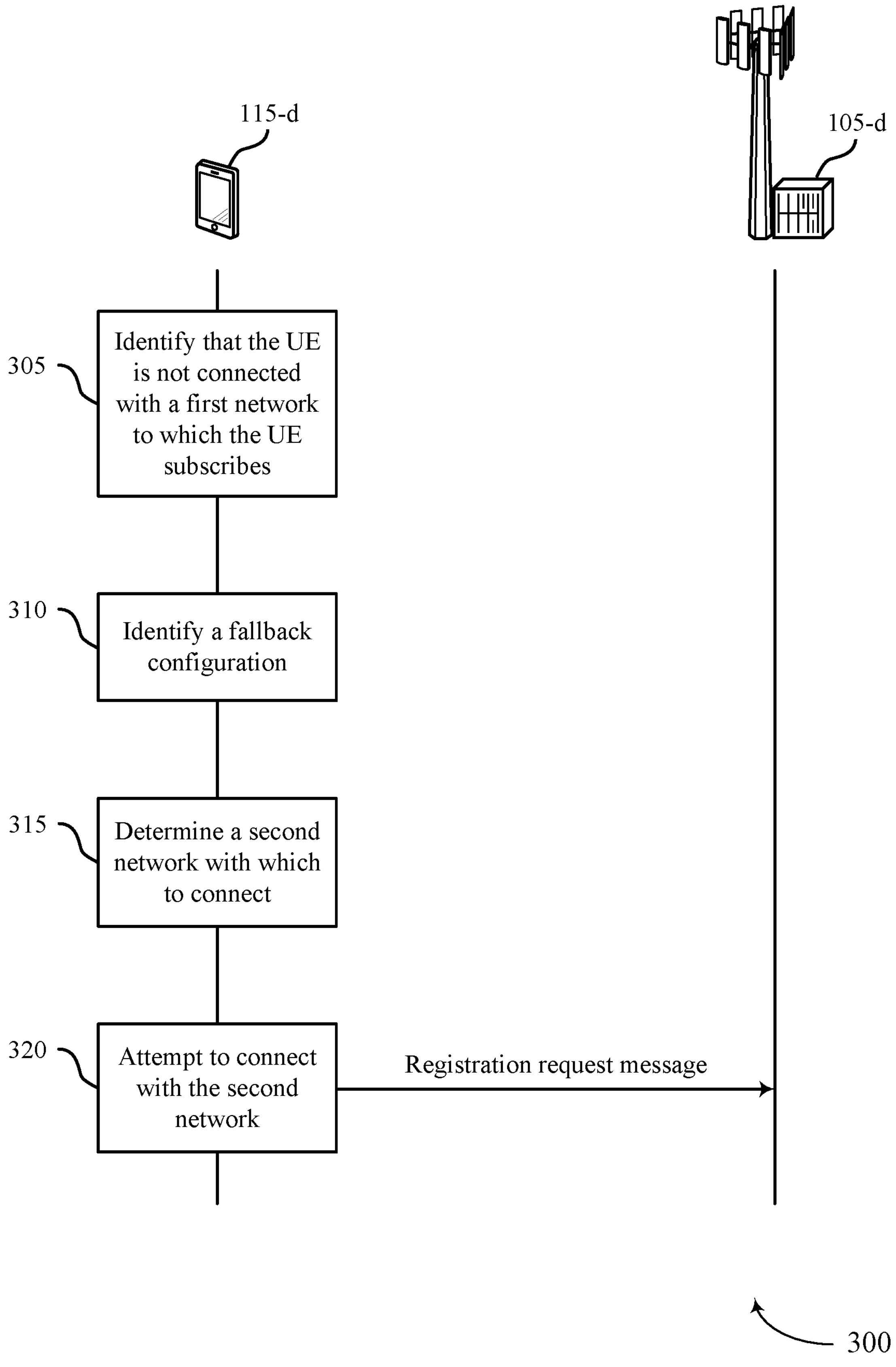
FIGS. 3 through 5 illustrate examples of process flows that support techniques for performing a network switching operation in accordance with aspects of the present disclosure.

FIG. 3 illustrates an example of a process flow 300 that supports techniques for performing a network switching operation in accordance with aspects of the present disclosure. The process flow 300 may illustrate an example network switching procedure. For example, UE 115-*d* may perform a network switching procedure with base station 105-*d*. Base station 105-*d* and UE 115-*d* may be examples of the corresponding wireless devices described with reference to FIGS. 1 and 2. In some cases, instead of UE 115-*d* performing the network switching procedure, a different type of wireless device (e.g., a base station 105) may implement a network switching procedure for a UE 115. Alternative examples of the following may be implemented, where some steps are performed in a different order than described or are not performed at all. In some cases, steps may include additional features not mentioned below, or further steps may be added.

At 305, UE 115-*d* may identify that UE 115-*d* is not connected with a first network to which UE 115-*d* subscribes. In some cases, UE 115-*d* may receive a notification from the first network that service to UE 115-*d* is to be provided by the one or more other networks via UE roaming. In some cases, the notification from the first network may indicate that the first network is unavailable. In some implementations, receiving the notification from the first network may include UE 115-*d* receiving, from the first network, a deregistration message indicating to UE 115-*d* to deregister from the first network. The deregistration message may include a set of networks arranged in a list based on a priority associated with each network or an identifier of a network (e.g., PLMN ID, network ID) with which UE 115-*d* is to connect. UE 115-*d* may determine to connect with the second network based on the deregistration message.

At 310, UE 115-*d* may identify a fallback configuration to be applied based on identifying that the UE is not connected with the first network. In some cases, identifying the fallback configuration is based on the notification from the first network. In some cases, identifying the fallback configuration may include UE 115-*d* identifying a set of networks that UE 115-*d* is allowed to switch to while the first network is unavailable, where the set of networks may be arranged in a list based on a priority associated with each network.

In some implementations, UE 115-*d* may be configured with the set of networks, where the set of networks may be included in a USIM of UE 115-*d*. In some implementations, UE 115-*d* may receive the set of networks via OTA via a UE parameter update procedure or a steering of roaming procedure.

In some cases, identifying the fallback configuration may include UE 115-*d* identifying a function for UE 115-*d* to use to determine an access identity for UE 115-*d* to use to determine which network of the one or more other networks with which to connect and to connect to the determined network. UE 115-*d* may calculate a value based on the function, where the value may indicate an access identity of a set of access identities, where each network may be associated with a particular access identity. In some cases, UE 115-*d* may determine one or more networks associated with the access identity indicated by the calculated value. In some cases, UE 115-*d* may determine that there is not a network available that is associated with the access identity indicated by the calculated value.

At 315, UE 115-*d* may determine, based on the fallback configuration, a second network of one or more other networks with which UE 115-*d* is to connect, UE 115-*d* may lack a subscription to any of the one or more other networks. In some cases, determining to connect with second network may include UE 115-*d* identifying a network in the set of networks associated with a highest priority (e.g., based on the list), where the second network is associated with the highest priority, and determining to establish a connection with the second network based on the second network being associated with the highest priority.

In some cases, determining to connect with second network may include UE 115-*d* identifying, at a first time, a network in the set of networks associated with a highest priority (e.g., based on the list), and determining, at a second time, to establish a connection with the second network based on the second network being associated with the highest priority. A duration between the first time and the second time may be randomly computed within a preconfigured range so as to mitigate the number of UEs 115 that attempt to join an network at a time.

In some implementations, UE 115-*d* may determine to connect with the second network based on a deregistration message. In some implementations, UE 115-*d* may determine to establish a connection with the second network based on the second network being associated with the access identity indicated by the calculated value. In some implementations, UE 115-*d* may determine to connect with the second network of the one or more other networks, randomly, based on determining that there is not a network available that is associated with the access identity indicated by the calculated value.

At 320, UE 115-*d* may attempt to connect with the second network based on the fallback configuration and UE 115-*d* not being connected with the first network.

Figure 4:
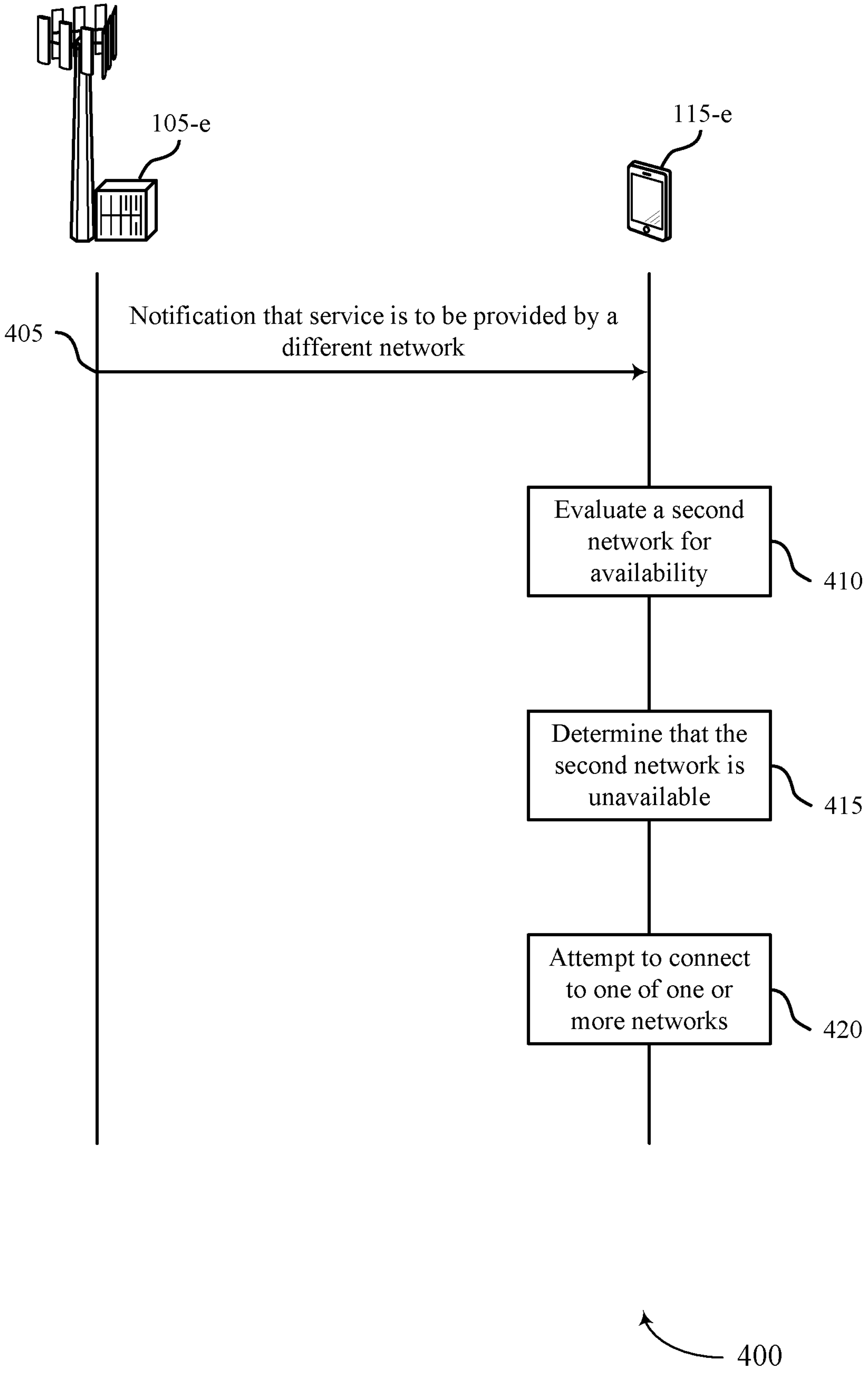

FIG. 4 illustrates an example of a process flow 400 that supports techniques for performing a network switching operation in accordance with aspects of the present disclosure. The process flow 400 may illustrate an example network switching procedure. For example, UE 115-*e* may perform a network switching procedure with base station 105-*e*. Base station 105-*e* and UE 115-*e* may be examples of the corresponding wireless devices described with reference to FIGS. 1 through 3. In some cases, instead of UE 115-*e* performing the network switching procedure, a different type of wireless device (e.g., a base station 105) may implement a network switching procedure for a UE 115. Alternative examples of the following may be implemented, where some steps are performed in a different order than described or are not performed at all. In some cases, steps may include additional features not mentioned below, or further steps may be added.

At 405, UE 115-*e* may receive a notification from a first network to which UE 115-*e* subscribes that service to UE 115-*e* is to be provided by one or more other networks via UE roaming.

At 410, UE 115-*e* may evaluate a second network of the one or more other networks for availability based on the notification from the first network. In some implementations, evaluating the second network may include UE 115-*e* monitoring for an indication, from the second network, that the second network is available as a fallback network while the first network is unavailable. UE 115-*e* may monitor for the indication, from the second network, in a SIB.

At 415, UE 115-*e* may determine, based on the evaluation, that the second network is currently unavailable to UE 115-*e*. In some cases, determining that the second network is unavailable may include UE 115-*e* determining that the indication is absent in broadcasts from the second network. In some cases, determining that the second network is unavailable may include UE 115-*e* transmit, to the second network, a registration message, and receiving, from the second network and in response to the registration message, a rejection message with a rejection cause indication. The rejection cause indication may indicate that UE 115-*e* is to attempt connection with a different network than the second network of the one or more other networks. The rejection message may include a back-off timer indicating a duration of time for UE 115-*e* to refrain from attempting to establish a connection with the second network.

At 420, UE 115-*e* may attempt to connect with one of the one or more other networks based on the determination that the second network is currently unavailable to UE 115-*e*. UE 115-*e* may attempt to connect with a third network of the one or more other networks based on the UE receiving the rejection cause indication from the second network. In some cases, attempting to connect with the one of the one or more other networks may include UE 115-*e* transmitting, to the second network, a second registration message based on the back-off timer expiring.

Figure 5:
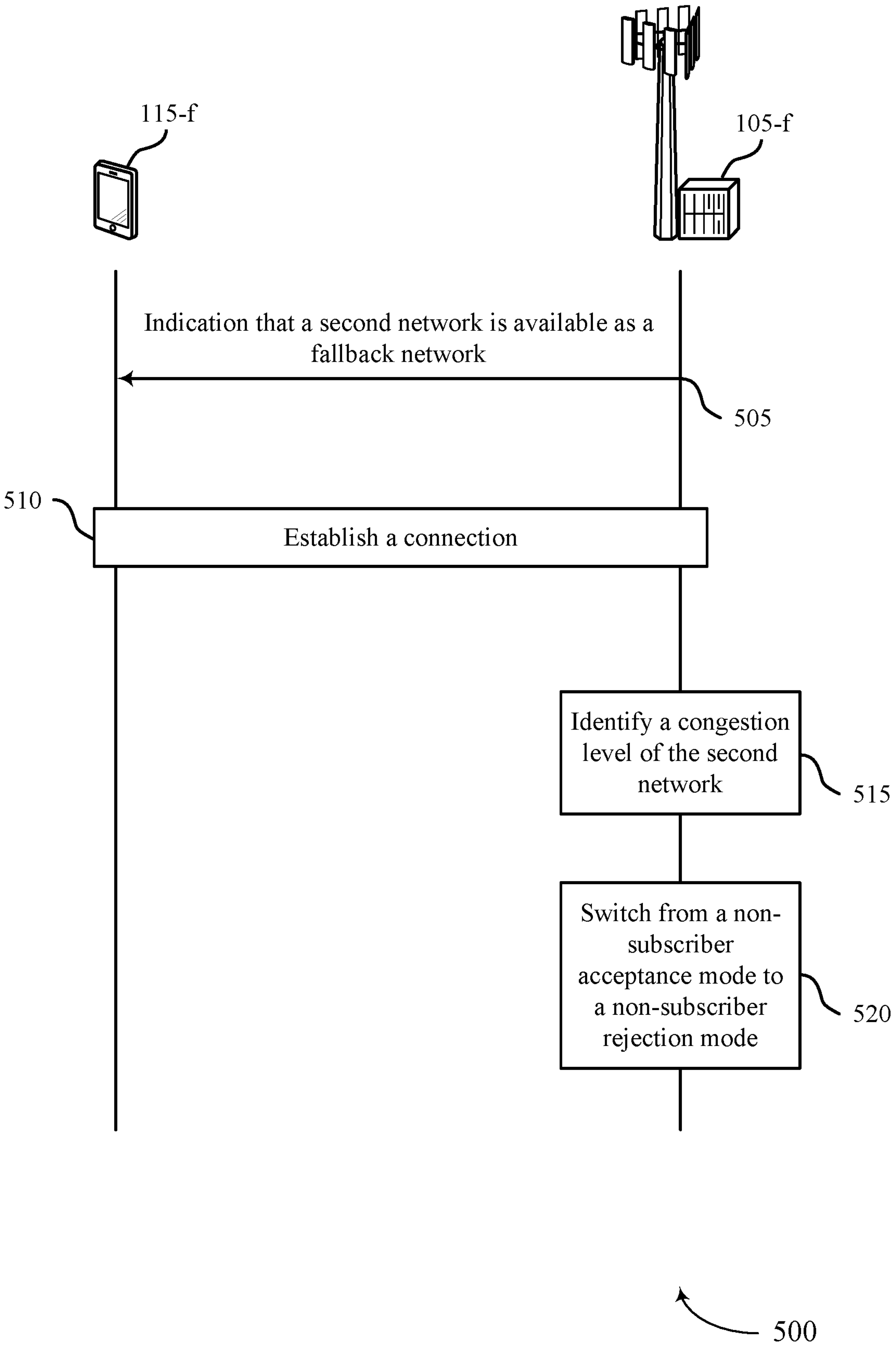

FIG. 5 illustrates an example of a process flow 500 that supports techniques for performing a network switching operation in accordance with aspects of the present disclosure. The process flow 500 may illustrate an example network switching procedure. For example, UE 115-*f* may perform a network switching procedure with base station 105-*f*. Base station 105-*f* and UE 115-*f* may be examples of the corresponding wireless devices described with reference to FIGS. 1 through 4. In some cases, instead of UE 115-*f* performing the network switching procedure, a different type of wireless device (e.g., a base station 105) may implement a network switching procedure for a UE 115. Alternative examples of the following may be implemented, where some steps are performed in a different order than described or are not performed at all. In some cases, steps may include additional features not mentioned below, or further steps may be added.

At 505, base station 105-*f* may transmit, during a non-subscriber UE acceptance mode, an indication that a second network is available as a fallback network while a first network is unavailable, where base station 105-*f* serves the second network. In some implementations, base station

**105-*f* may receive a notification that the first network to which one or more UEs 115 subscribe is unavailable and that the one or more UEs 115** are to attempt to connect with one or more other networks via roaming. In some cases, transmitting the indication during the non-subscriber UE acceptance mode is based on receiving the notification that the first network to which one or more UEs subscribe is unavailable.

At 510, base station **105-*f* may establish a connection with one or more UEs 115, such as UE 115-*f*, based on receiving registration messages from the one or more UEs 115** in response to transmitting the indication.

At 515, base station **105-*f* may identify a congestion level of the second network and that the identified congestion level is equal to or greater than a congestion level threshold. In some cases, identifying the congestion level of the second network may include base station 105-*f* receiving a message from an AMF of base station 105-*f* indicating base station 105-*f* to switch to the non-subscriber UE rejection mode. Base station 105-*f*** may refrain from transmitting the indication that the second network is available as a fallback network.

At 520, base station **105-*f* may switch from the non-subscriber UE acceptance mode to a non-subscriber UE rejection mode in which base station 105-*f* rejects connection with non-subscriber UEs 115**. The switching may be based on the congestion level being equal to or greater than the congestion level threshold.

In some cases, base station **105-*f* may transmit, during the non-subscriber UE rejection mode, the indication that the second network is available as a fallback network while the first network is unavailable. Base station 105-*f* may receive registration messages from the one or more UEs 115 in response to transmitting the indication, and, transmit to the one or more UEs 115, a rejection message with a rejection cause indication. The rejection message may include an indication for each of the one or more UEs 115 to attempt connection with a different network than the second network. The rejection message may include a back-off timer indicating a duration of time for each of the one or more UEs 115 to refrain from attempting to establish connection with the second network. In some cases, base station 105-*f* may receive, from one or more of the one or more UEs 115**, a second registration message based on the back-off timer expiring.

Figure 6:
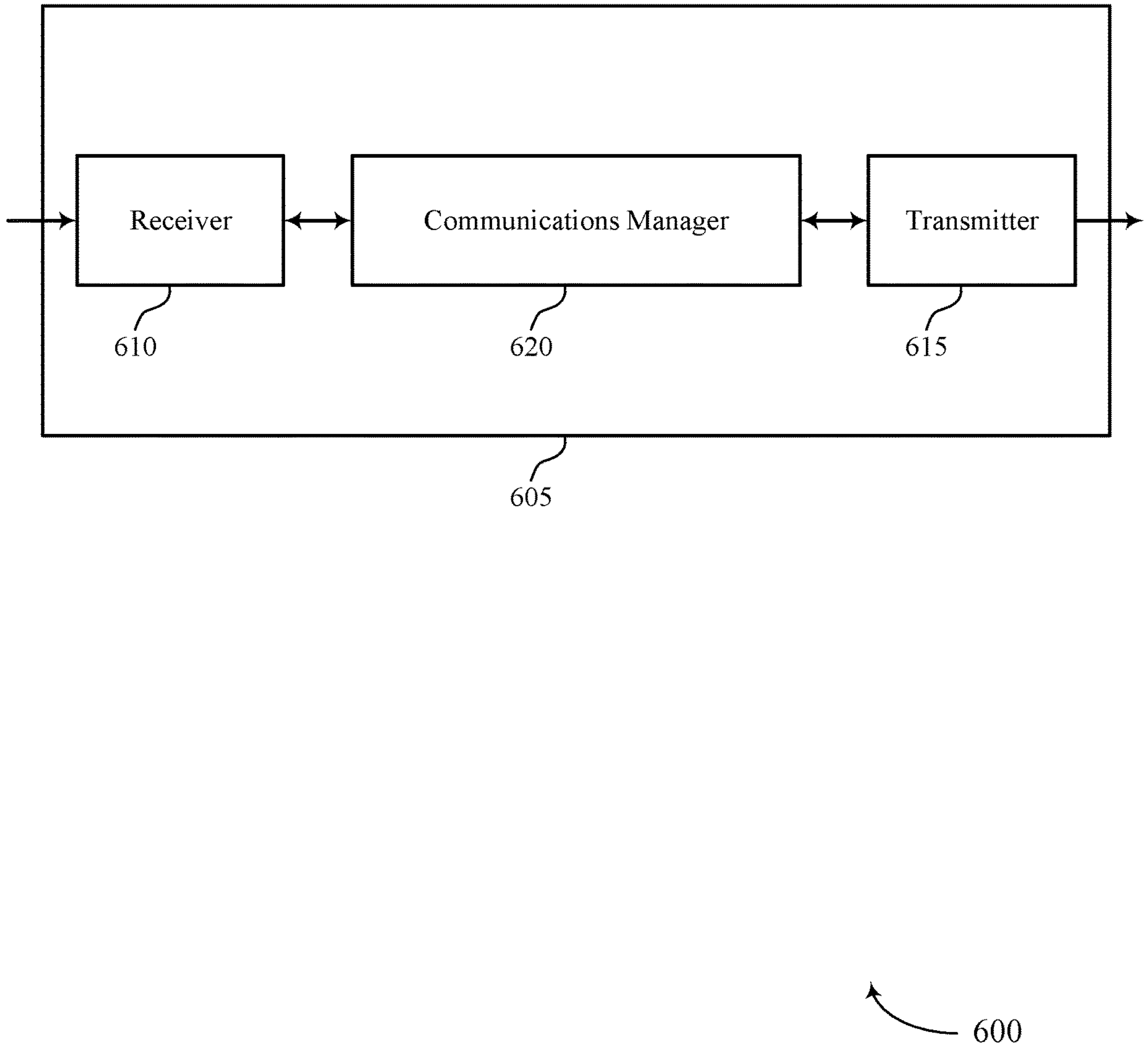
FIGS. 6 and 7 show block diagrams of devices that support techniques for performing a network switching operation in accordance with aspects of the present disclosure.

FIG. 6 shows a block diagram 600 of a device 605 that supports techniques for performing a network switching operation in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for performing a network switching operation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for performing a network switching operation). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for performing a network switching operation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. For example, the communications manager 620 may be configured as or otherwise support a means for identifying that the UE is not connected with a first network to which the UE subscribes. The communications manager 620 may be configured as or otherwise support a means for identifying a fallback configuration to be applied based on identifying that the UE is not connected with the first network. The communications manager 620 may be configured as or otherwise support a means for determining, based on the fallback configuration, a second network of one or more other networks with which the UE is to connect, the UE lacking a subscription to any of the one or more other networks. The communications manager 620 may be configured as or otherwise support a means for attempting to connect with the second network based on the fallback configuration and the UE not being connected with the first network.

Additionally or alternatively, the communications manager 620 may support wireless communications at a UE in accordance with examples as disclosed herein. For example, the communications manager 620 may be configured as or otherwise support a means for receiving a notification from a first network to which the UE subscribes that service to the UE is to be provided by one or more other networks via UE roaming. The communications manager 620 may be configured as or otherwise support a means for evaluating a second network of the one or more other networks for availability based on the notification from the first network. The communications manager 620 may be configured as or otherwise support a means for determining, based on the evaluation, that the second network is currently unavailable to the UE. The communications manager 620 may be configured as or otherwise support a means for attempting to connect with one of the one or more other networks based on the determination that the second network is currently unavailable to the UE.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for efficient network switching operations. For example, the communications manager 615 as described herein may be implemented to realize one or more potential advantages. One implementation may allow the device 605 to more efficiently determine a network to switch without overloading the network. For example, a device 605 may be unable to receive service from the network provider of the device 605, and the device 605 may perform a network switching operation such that networks in the same area do not become overloaded.

Based on implementing the network switching techniques as described herein, a processor of a UE 115 (e.g., controlling the receiver 610, the transmitter 620, or the transceiver 920 as described with reference to FIG. 9) may increase reliability and efficiency in the switching procedure of a UE 115 from one network to another.

Figure 7:
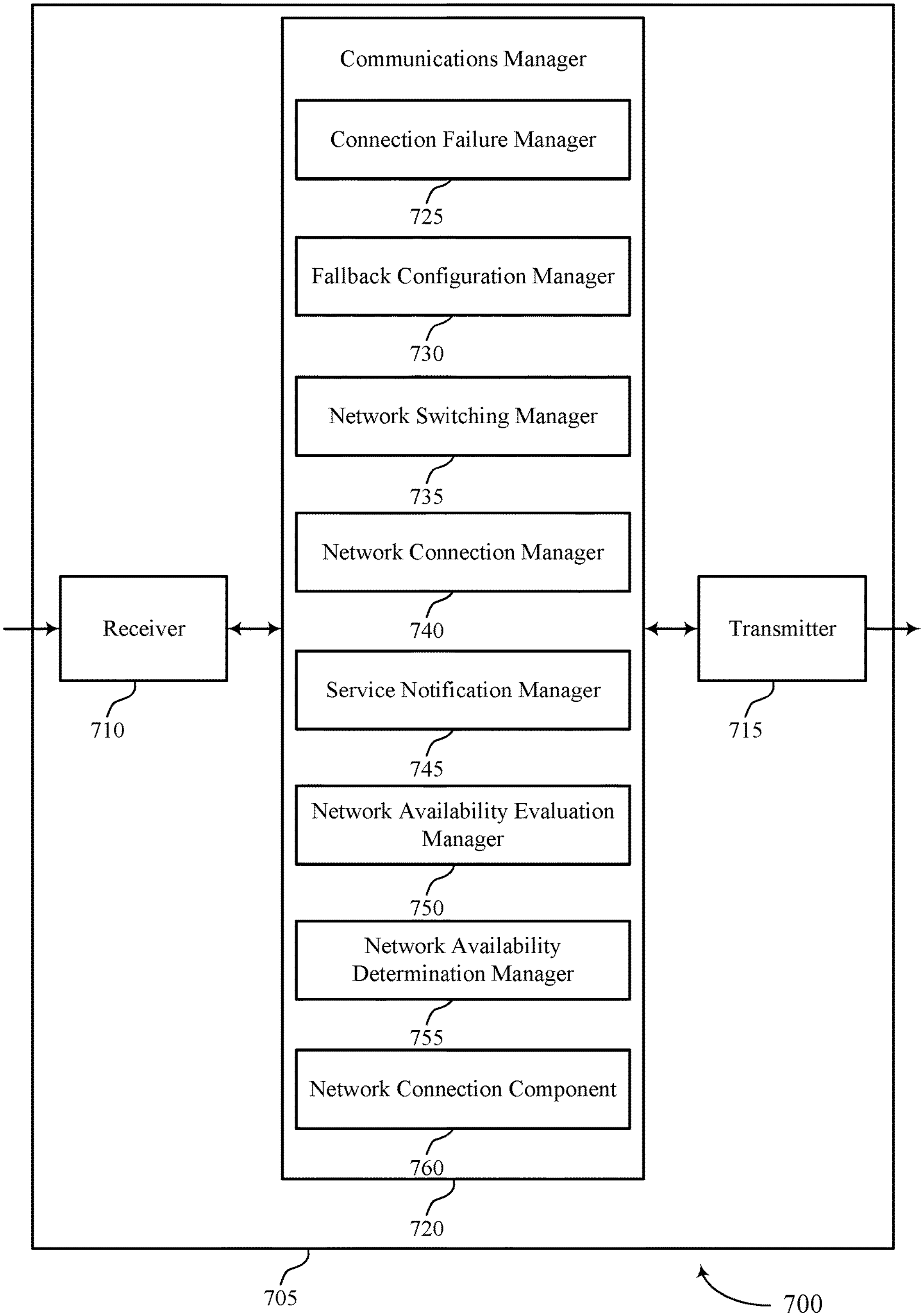

FIG. 7 shows a block diagram 700 of a device 705 that supports techniques for performing a network switching operation in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for performing a network switching operation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for performing a network switching operation). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for performing a network switching operation as described herein. For example, the communications manager 720 may include a connection failure manager 725, a fallback configuration manager 730, a network switching manager 735, a network connection manager 740, a service notification manager 745, a network availability evaluation manager 750, a network availability determination manager 755, a network connection component 760, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. The connection failure manager 725 may be configured as or otherwise support a means for identifying that the UE is not connected with a first network to which the UE subscribes. The fallback configuration manager 730 may be configured as or otherwise support a means for identifying a fallback configuration to be applied based on identifying that the UE is not connected with the first network. The network switching manager 735 may be configured as or otherwise support a means for determining, based on the fallback configuration, a second network of one or more other networks with which the UE is to connect, the UE lacking a subscription to any of the one or more other networks. The network connection manager 740 may be configured as or otherwise support a means for attempting to connect with the second network based on the fallback configuration and the UE not being connected with the first network.

Additionally or alternatively, the communications manager 720 may support wireless communications at a UE in accordance with examples as disclosed herein. The service notification manager 745 may be configured as or otherwise support a means for receiving a notification from a first network to which the UE subscribes that service to the UE is to be provided by one or more other networks via UE roaming. The network availability evaluation manager 750 may be configured as or otherwise support a means for evaluating a second network of the one or more other networks for availability based on the notification from the first network. The network availability determination manager 755 may be configured as or otherwise support a means for determining, based on the evaluation, that the second network is currently unavailable to the UE. The network connection component 760 may be configured as or otherwise support a means for attempting to connect with one of the one or more other networks based on the determination that the second network is currently unavailable to the UE.

Figure 8:
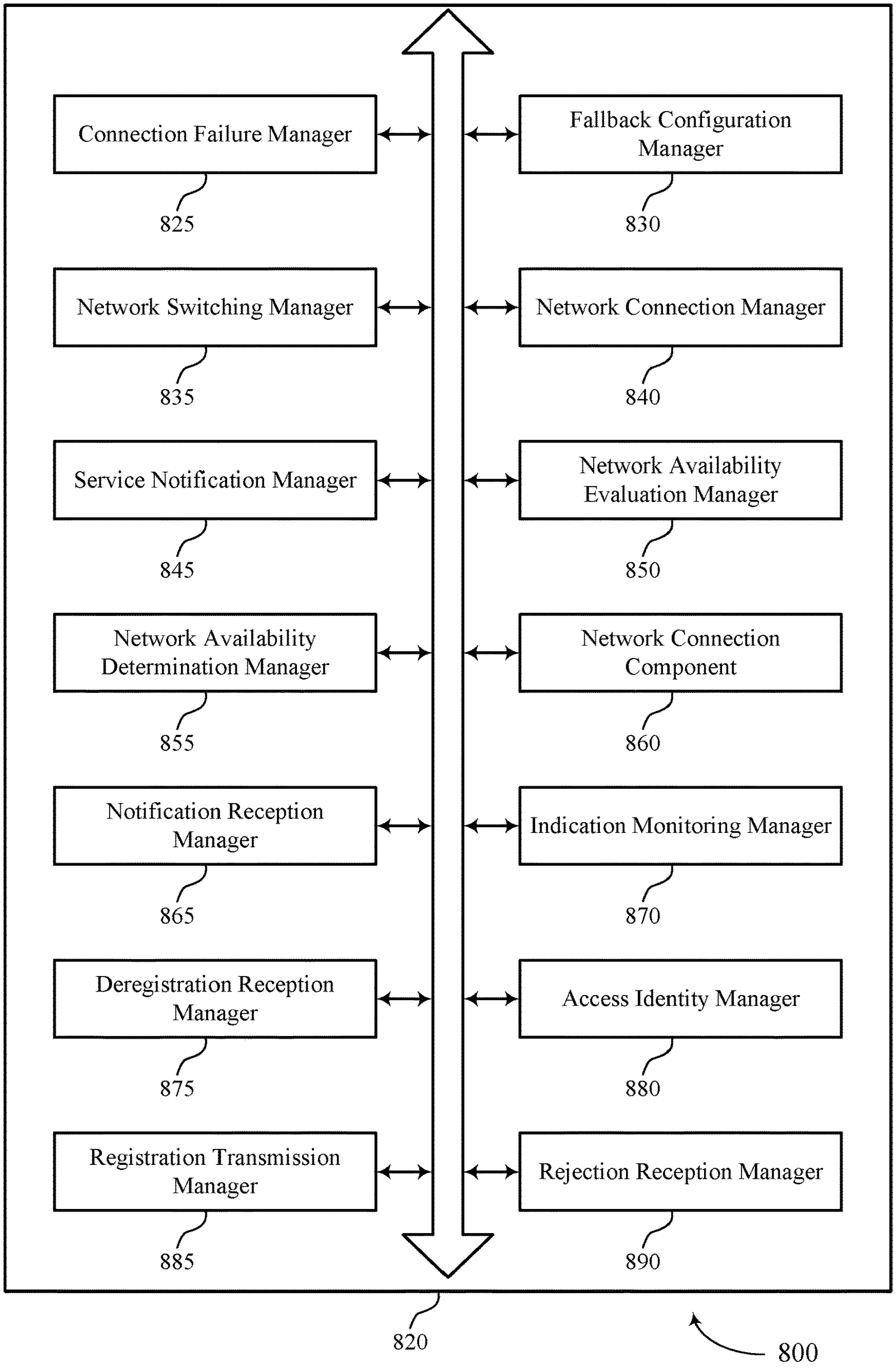
FIG. 8 shows a block diagram of a communications manager that supports techniques for performing a network switching operation in accordance with aspects of the present disclosure.

FIG. 8 shows a block diagram 800 of a communications manager 820 that supports techniques for performing a network switching operation in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for performing a network switching operation as described herein. For example, the communications manager 820 may include a connection failure manager 825, a fallback configuration manager 830, a network switching manager 835, a network connection manager 840, a service notification manager 845, a network availability evaluation manager 850, a network availability determination manager 855, a network connection component 860, a notification reception manager 865, an indication monitoring manager 870, a deregistration reception manager 875, an access identity manager 880, a registration transmission manager 885, a rejection reception manager 890, or any combination thereof. Each of these components may communicate, directly or indirectly, with one another (e.g., via one or more buses).

The communications manager 820 may support wireless communications at a UE in accordance with examples as disclosed herein. The connection failure manager 825 may be configured as or otherwise support a means for identifying that the UE is not connected with a first network to which the UE subscribes. The fallback configuration manager 830 may be configured as or otherwise support a means for identifying a fallback configuration to be applied based on identifying that the UE is not connected with the first network. The network switching manager 835 may be configured as or otherwise support a means for determining, based on the fallback configuration, a second network of one or more other networks with which the UE is to connect, the UE lacking a subscription to any of the one or more other networks. The network connection manager 840 may be configured as or otherwise support a means for attempting to connect with the second network based on the fallback configuration and the UE not being connected with the first network.

In some examples, the notification reception manager 865 may be configured as or otherwise support a means for receiving a notification from the first network that service to the UE is to be provided by the one or more other networks via UE roaming, where identifying the fallback configuration is based on the notification from the first network. In some examples, the notification from the first network indicates that the first network is unavailable.

In some examples, to support identifying the fallback configuration, the fallback configuration manager 830 may be configured as or otherwise support a means for identifying a set of networks that the UE is allowed to switch to while the first network is unavailable, the set of networks arranged in a list based on a priority associated with each network.

In some examples, to support determining to connect with the second network, the fallback configuration manager 830 may be configured as or otherwise support a means for identifying a network in the set of networks associated with a highest priority, the second network associated with the highest priority. In some examples, to support determining to connect with the second network, the network connection manager 840 may be configured as or otherwise support a means for determining to establish a connection with the second network based on the second network being associated with the highest priority.

In some examples, to support determining to connect with the second network, the fallback configuration manager 830 may be configured as or otherwise support a means for identifying, at a first time, a network in the set of networks associated with a highest priority, the second network associated with the highest priority. In some examples, to support determining to connect with the second network, the network connection manager 840 may be configured as or otherwise support a means for determining, at a second time, to establish a connection with the second network based on the second network being associated with the highest priority, a duration between the first time and the second time being pre-configured.

In some examples, the UE is configured with the set of networks, the set of networks included in a data file of a USIM of the UE.

In some examples, the fallback configuration manager 830 may be configured as or otherwise support a means for receiving the set of networks via OTA via a UE parameter update procedure or a steering of roaming procedure.

In some examples, the network switching manager 835 may monitor for an indication, from the second network, that the second network is available as a fallback network while the first network is unavailable. In some examples, the network switching manager 835 may determine that the indication is absent in broadcasts from the second network.

In some examples, to support receiving the notification from the first network, the deregistration reception manager 875 may be configured as or otherwise support a means for receiving, from the first network, a deregistration message indicating to the UE to deregister from the first network. In some examples, the deregistration message includes a set of networks arranged in a list based on a priority associated with each network or an identifier of a network with which the UE is to connect, the UE determines to connect with the second network based on the deregistration message.

In some examples, to support identifying the fallback configuration, the fallback configuration manager 830 may be configured as or otherwise support a means for identifying a function for the UE to use to determine an access identity for the UE to use to determine which network of the one or more other networks with which to connect and to connect to the determined network. In some examples, the access identity manager 880 may be configured as or otherwise support a means for calculating a value based on the function, the value indicating an access identity of a set of access identities, where each network is associated with a particular access identity.

In some examples, the network switching manager 835 may be configured as or otherwise support a means for determining one or more networks associated with the access identity indicated by the calculated value. In some examples, the network connection manager 840 may be configured as or otherwise support a means for determining to establish a connection with the second network based on the second network being associated with the access identity indicated by the calculated value.

In some examples, the network switching manager 835 may be configured as or otherwise support a means for determining that there is not a network available that is associated with the access identity indicated by the calculated value. In some examples, the network connection manager 840 may be configured as or otherwise support a means for determining to connect with the second network of the one or more other networks, randomly, based on determining that there is not a network available that is associated with the access identity indicated by the calculated value.

Additionally or alternatively, the communications manager 820 may support wireless communications at a UE in accordance with examples as disclosed herein. The service notification manager 845 may be configured as or otherwise support a means for receiving a notification from a first network to which the UE subscribes that service to the UE is to be provided by one or more other networks via UE roaming. The network availability evaluation manager 850 may be configured as or otherwise support a means for evaluating a second network of the one or more other networks for availability based on the notification from the first network. The network availability determination manager 855 may be configured as or otherwise support a means for determining, based on the evaluation, that the second network is currently unavailable to the UE. The network connection component 860 may be configured as or otherwise support a means for attempting to connect with one of the one or more other networks based on the determination that the second network is currently unavailable to the UE.

In some examples, to support evaluating the second network of the one or more other networks for availability, the indication monitoring manager 870 may be configured as or otherwise support a means for monitoring for an indication, from the second network, that the second network is available as a fallback network while the first network is unavailable.

In some examples, to support determining that the second network is currently unavailable to the UE, the indication monitoring manager 870 may be configured as or otherwise support a means for determining that the indication is absent in broadcasts from the second network.

In some examples, to support determining that the second network is currently unavailable to the UE, the registration transmission manager 885 may be configured as or otherwise support a means for transmitting, to the second network, a registration message. In some examples, to support determining that the second network is currently unavailable to the UE, the rejection reception manager 890 may be configured as or otherwise support a means for receiving, from the second network and in response to the registration message, a rejection message with a rejection cause indication.

In some examples, the rejection cause indication indicates that the UE is to attempt connection with a different network than the second network of the one or more other networks. In some examples, to support attempting to connect with one of the one or more other networks, the network connection component 860 may be configured as or otherwise support a means for attempting to connect with a third network of the one or more other networks based on the UE receiving the rejection cause indication from the second network.

In some examples, the rejection message includes a back-off timer indicating a duration of time for the UE to refrain from attempting to establish a connection with the second network. In some examples, to support attempting to connect with the one of the one or more other networks, the registration transmission manager 885 may be configured as or otherwise support a means for transmitting, to the second network, a second registration message based on the back-off timer expiring.

In some examples, the UE monitors for the indication, from the second network, in an SIB.

Figure 9:
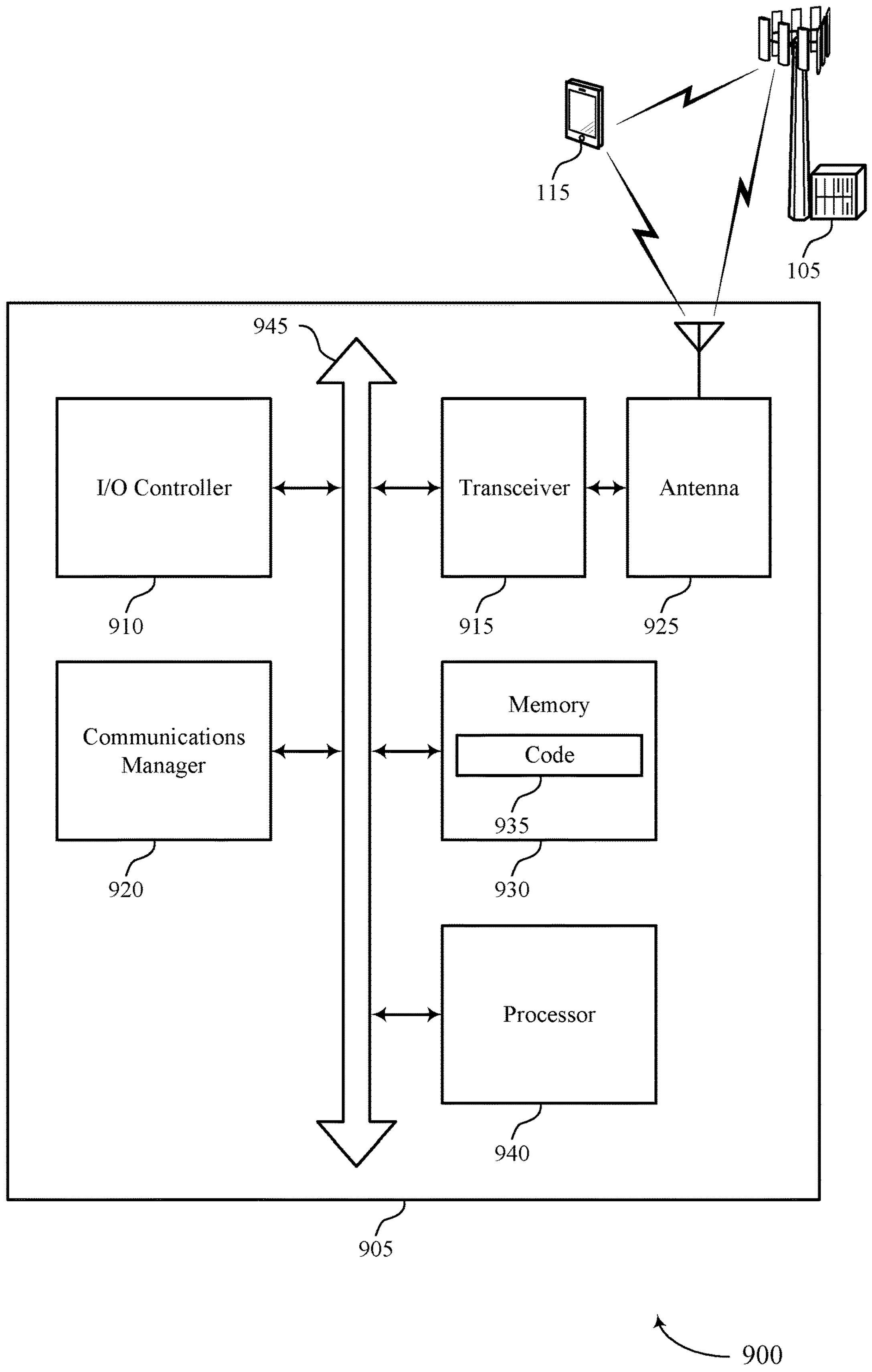
FIG. 9 shows a diagram of a system including a device that supports techniques for performing a network switching operation in accordance with aspects of the present disclosure.

FIG. 9 shows a diagram of a system 900 including a device 905 that supports techniques for performing a network switching operation in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for performing a network switching operation). For example, the device 905 or a component of the device 905 may include a processor 940 and memory 930 coupled to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for identifying that the UE is not connected with a first network to which the UE subscribes. The communications manager 920 may be configured as or otherwise support a means for identifying a fallback configuration to be applied based on identifying that the UE is not connected with the first network. The communications manager 920 may be configured as or otherwise support a means for determining, based on the fallback configuration, a second network of one or more other networks with which the UE is to connect, the UE lacking a subscription to any of the one or more other networks. The communications manager 920 may be configured as or otherwise support a means for attempting to connect with the second network based on the fallback configuration and the UE not being connected with the first network.

Additionally or alternatively, the communications manager 920 may support wireless communications at a UE in accordance with examples as disclosed herein. For example, the communications manager 920 may be configured as or otherwise support a means for receiving a notification from a first network to which the UE subscribes that service to the UE is to be provided by one or more other networks via UE roaming. The communications manager 920 may be configured as or otherwise support a means for evaluating a second network of the one or more other networks for availability based on the notification from the first network. The communications manager 920 may be configured as or otherwise support a means for determining, based on the evaluation, that the second network is currently unavailable to the UE. The communications manager 920 may be configured as or otherwise support a means for attempting to connect with one of the one or more other networks based on the determination that the second network is currently unavailable to the UE.

By including or configuring the communications manager 920 in accordance with examples as described herein, the device 905 may support techniques for improved communication reliability, reduced latency, and improved user experience related to an improved process in which a UE may switch networks when unable to receive service from the UEs main network.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for performing a network switching operation as described herein, or the processor 940 and the memory 930 may be otherwise configured to perform or support such operations.

Figure 10:
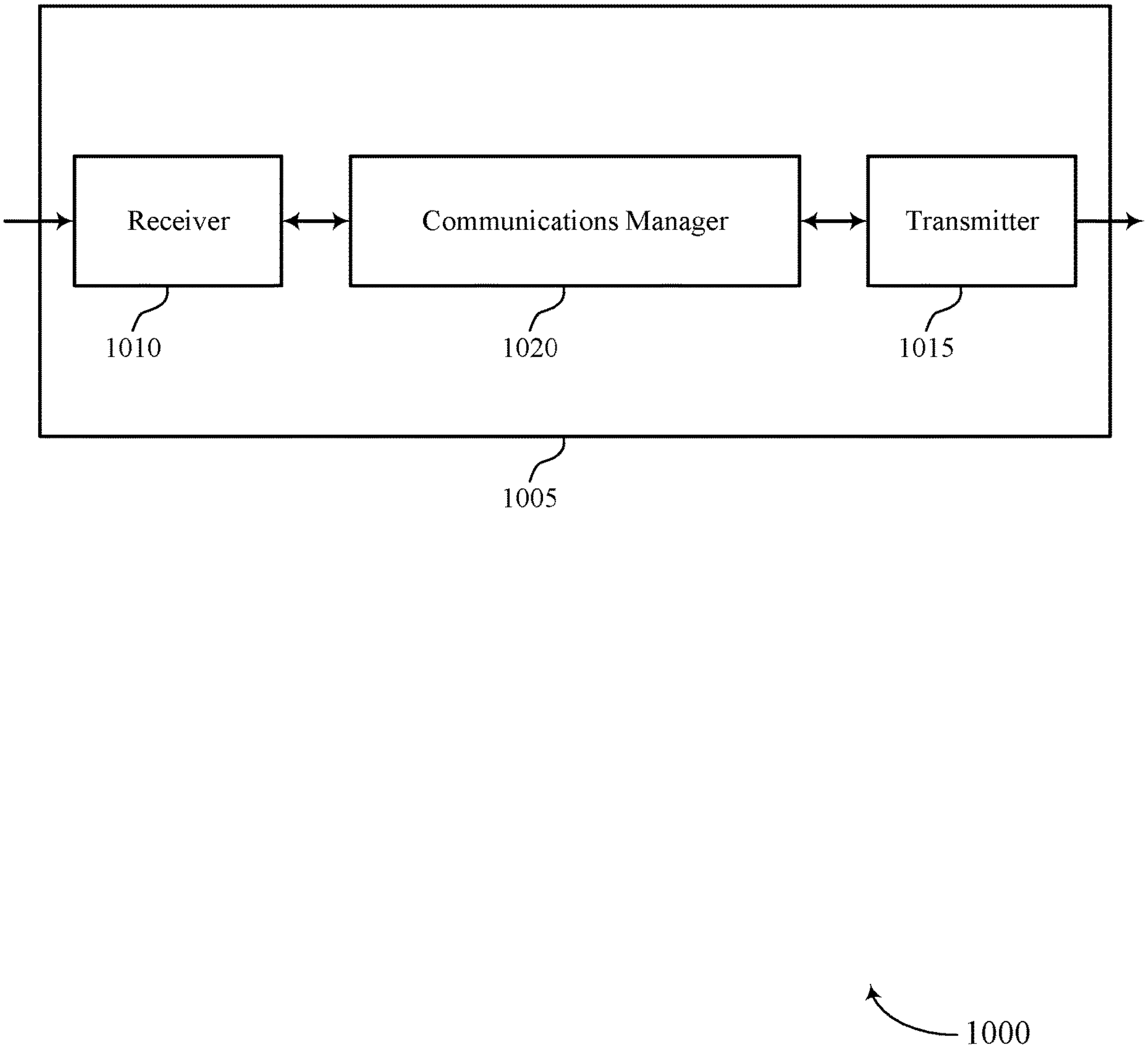
FIGS. 10 and 11 show block diagrams of devices that support techniques for performing a network switching operation in accordance with aspects of the present disclosure.

FIG. 10 shows a block diagram 1000 of a device 1005 that supports techniques for performing a network switching operation in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for performing a network switching operation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for performing a network switching operation). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for performing a network switching operation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. For example, the communications manager 1020 may be configured as or otherwise support a means for transmitting, during a non-subscriber UE acceptance mode, an indication that a second network is available as a fallback network while a first network is unavailable, the base station serving the second network. The communications manager 1020 may be configured as or otherwise support a means for establishing a connection with one or more UEs based on receiving registration messages from the one or more UEs in response to transmitting the indication. The communications manager 1020 may be configured as or otherwise support a means for identifying a congestion level of the second network and that the identified congestion level is equal to or greater than a congestion level threshold. The communications manager 1020 may be configured as or otherwise support a means for switching from the non-subscriber UE acceptance mode to a non-subscriber UE rejection mode in which the base station rejects connection with non-subscriber UEs, the switching based on the congestion level being equal to or greater than the congestion level threshold.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for improved network switching operations by improving communication reliability and reducing latency.

Figure 11:
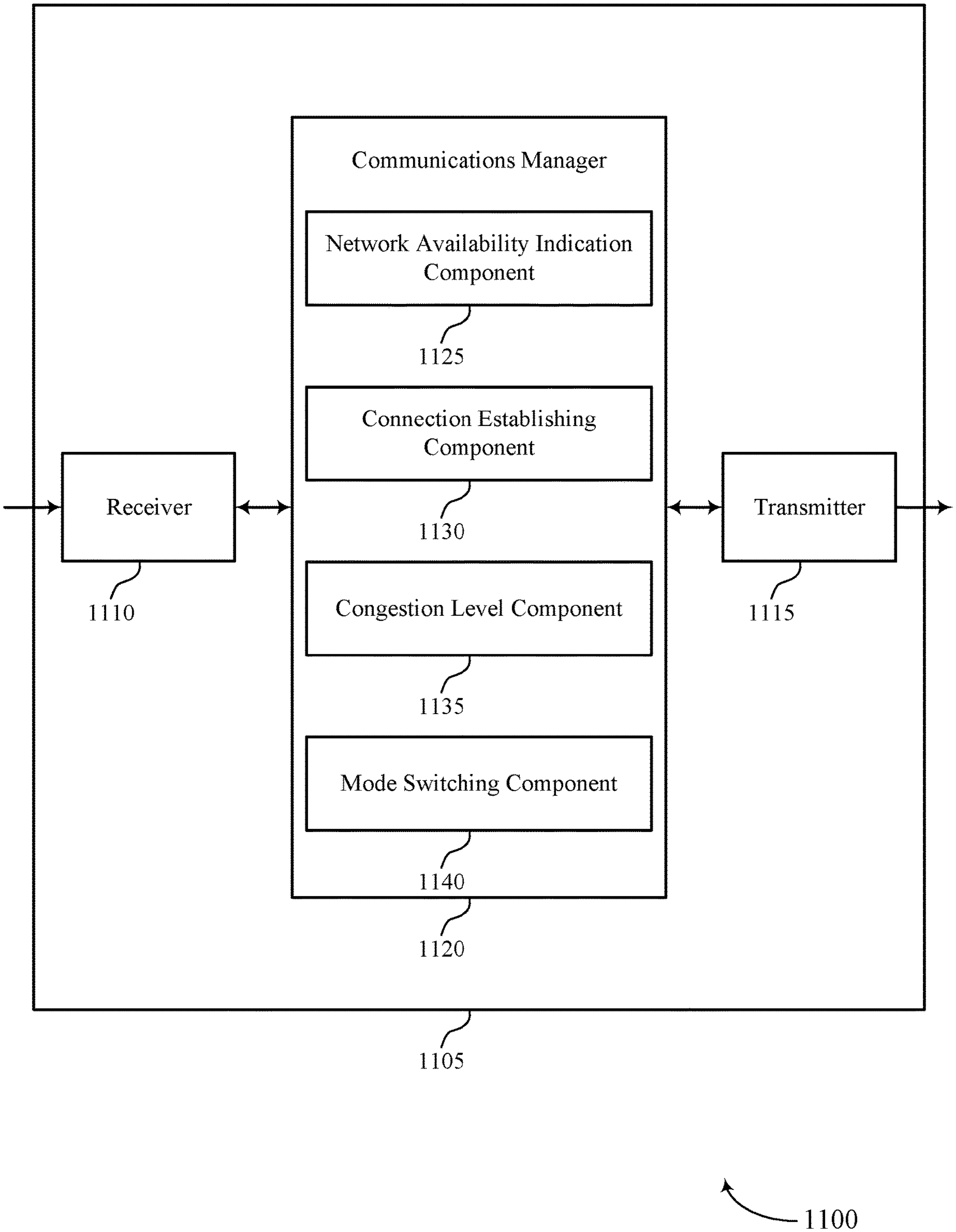

FIG. 11 shows a block diagram 1100 of a device 1105 that supports techniques for performing a network switching operation in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for performing a network switching operation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for performing a network switching operation). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for performing a network switching operation as described herein. For example, the communications manager 1120 may include a network availability indication component 1125, a connection establishing component 1130, a congestion level component 1135, a mode switching component 1140, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. The network availability indication component 1125 may be configured as or otherwise support a means for transmitting, during a non-subscriber UE acceptance mode, an indication that a second network is available as a fallback network while a first network is unavailable, the base station serving the second network. The connection establishing component 1130 may be configured as or otherwise support a means for establishing a connection with one or more UEs based on receiving registration messages from the one or more UEs in response to transmitting the indication. The congestion level component 1135 may be configured as or otherwise support a means for identifying a congestion level of the second network and that the identified congestion level is equal to or greater than a congestion level threshold. The mode switching component 1140 may be configured as or otherwise support a means for switching from the non-subscriber UE acceptance mode to a non-subscriber UE rejection mode in which the base station rejects connection with non-subscriber UEs, the switching based on the congestion level being equal to or greater than the congestion level threshold.

Figure 12:
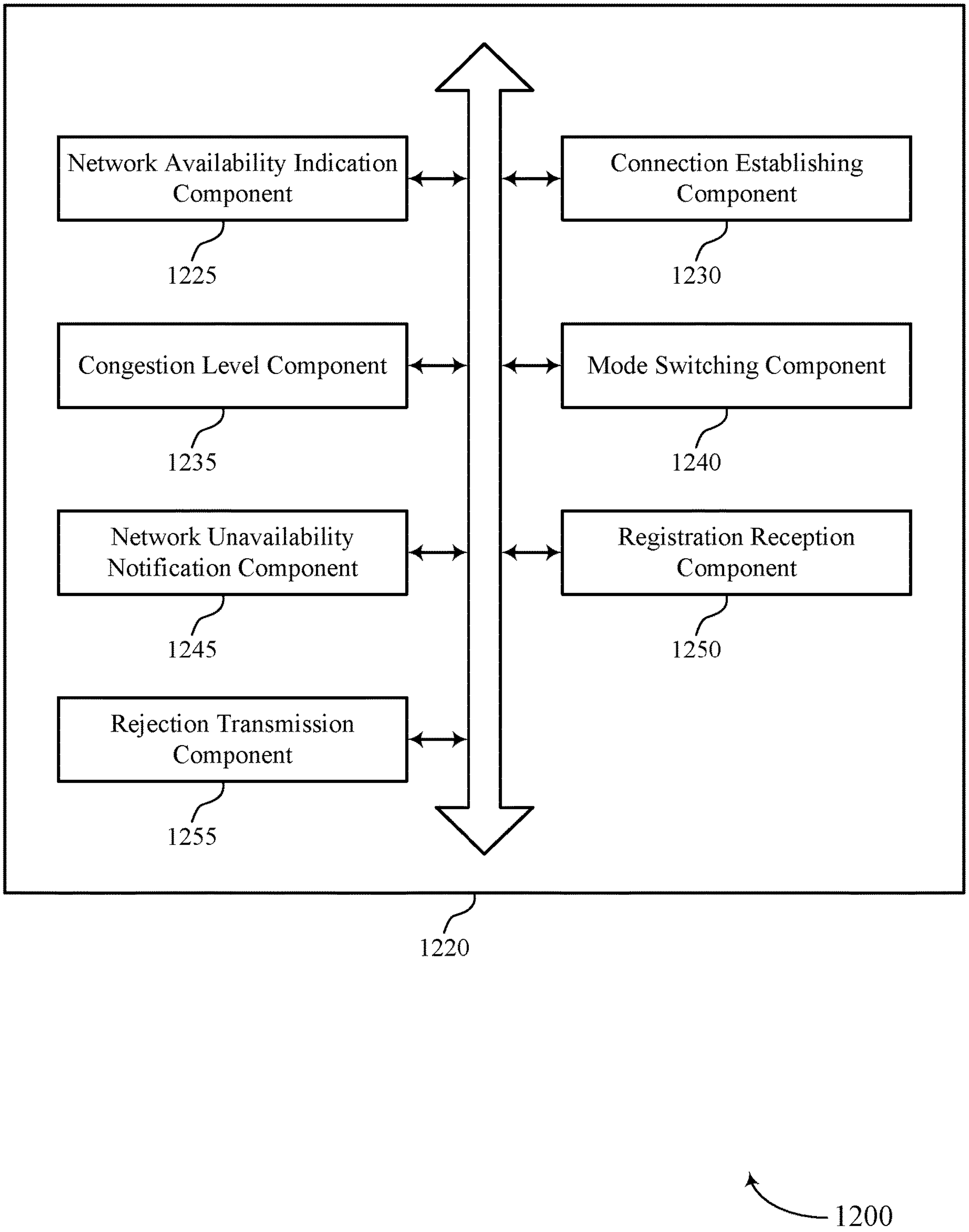
FIG. 12 shows a block diagram of a communications manager that supports techniques for performing a network switching operation in accordance with aspects of the present disclosure.

FIG. 12 shows a block diagram 1200 of a communications manager 1220 that supports techniques for performing a network switching operation in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for performing a network switching operation as described herein. For example, the communications manager 1220 may include a network availability indication component 1225, a connection establishing component 1230, a congestion level component 1235, a mode switching component 1240, a network unavailability notification component 1245, a registration reception component 1250, a rejection transmission component 1255, or any combination thereof. Each of these components may communicate, directly or indirectly, with one another (e.g., via one or more buses).

The communications manager 1220 may support wireless communications at a base station in accordance with examples as disclosed herein. The network availability indication component 1225 may be configured as or otherwise support a means for transmitting, during a non-subscriber UE acceptance mode, an indication that a second network is available as a fallback network while a first network is unavailable, the base station serving the second network. The connection establishing component 1230 may be configured as or otherwise support a means for establishing a connection with one or more UEs based on receiving registration messages from the one or more UEs in response to transmitting the indication. The congestion level component 1235 may be configured as or otherwise support a means for identifying a congestion level of the second network and that the identified congestion level is equal to or greater than a congestion level threshold. The mode switching component 1240 may be configured as or otherwise support a means for switching from the non-subscriber UE acceptance mode to a non-subscriber UE rejection mode in which the base station rejects connection with non-subscriber UEs, the switching based on the congestion level being equal to or greater than the congestion level threshold.

In some examples, to support identifying the congestion level of the second network, the congestion level component 1235 may be configured as or otherwise support a means for receiving a message from an AMF of the base station indicating the base station to switch to the non-subscriber UE rejection mode. In some examples, the base station refrains from transmitting the indication that the second network is available as a fallback network.

In some examples, the network availability indication component 1225 may be configured as or otherwise support a means for transmitting, during the non-subscriber UE rejection mode, the indication that the second network is available as a fallback network while the first network is unavailable. In some examples, the registration reception component 1250 may be configured as or otherwise support a means for receiving registration messages from the one or more UEs in response to transmitting the indication. In some examples, the rejection transmission component 1255 may be configured as or otherwise support a means for transmitting, to the one or more UEs, a rejection message with a rejection cause indication.

In some examples, the rejection message includes an indication for each of the one or more UEs to attempt connection with a different network than the second network. In some examples, the rejection message includes a back-off timer indicating a duration of time for each of the one or more UEs to refrain from attempting to establish connection with the second network. In some examples, the registration reception component 1250 may be configured as or otherwise support a means for receiving, from one or more of the one or more UEs, a second registration message based on the back-off timer expiring.

In some examples, the network unavailability notification component 1245 may be configured as or otherwise support a means for receiving a notification that the first network to which one or more UEs subscribe is unavailable and that the one or more UEs are to attempt to connect with one or more other networks via roaming. In some examples, transmitting the indication during the non-subscriber UE acceptance mode is based on receiving the notification that the first network to which one or more UEs subscribe is unavailable.

Figure 13:
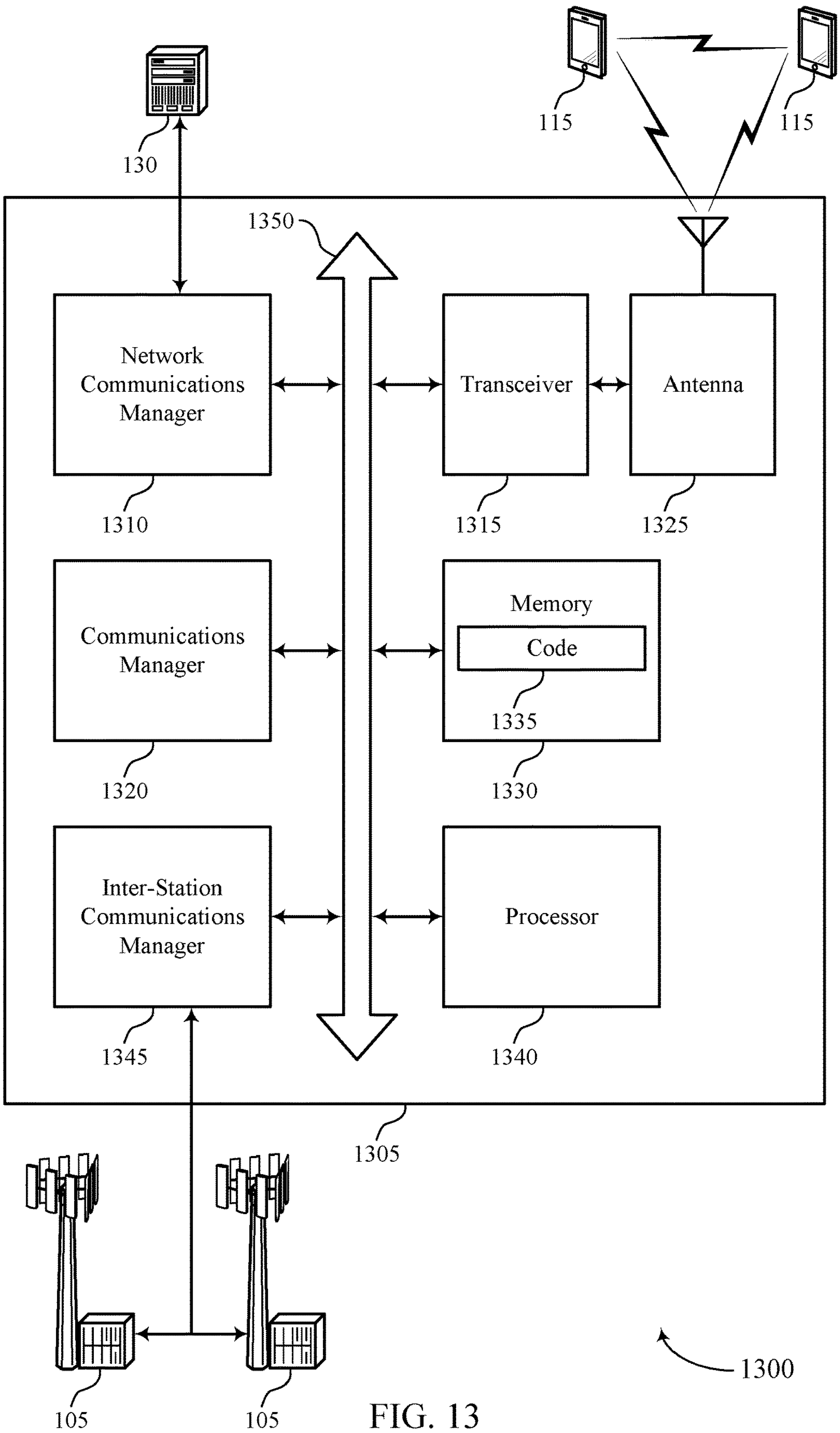
FIG. 13 shows a diagram of a system including a device that supports techniques for performing a network switching operation in accordance with aspects of the present disclosure.

FIG. 13 shows a diagram of a system 1300 including a device 1305 that supports techniques for performing a network switching operation in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for performing a network switching operation). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at a base station in accordance with examples as disclosed herein. For example, the communications manager 1320 may be configured as or otherwise support a means for transmitting, during a non-subscriber UE acceptance mode, an indication that a second network is available as a fallback network while a first network is unavailable, the base station serving the second network. The communications manager 1320 may be configured as or otherwise support a means for establishing a connection with one or more UEs based on receiving registration messages from the one or more UEs in response to transmitting the indication. The communications manager 1320 may be configured as or otherwise support a means for identifying a congestion level of the second network and that the identified congestion level is equal to or greater than a congestion level threshold. The communications manager 1320 may be configured as or otherwise support a means for switching from the non-subscriber UE acceptance mode to a non-subscriber UE rejection mode in which the base station rejects connection with non-subscriber UEs, the switching based on the congestion level being equal to or greater than the congestion level threshold.

By including or configuring the communications manager 1320 in accordance with examples as described herein, the device 1305 may support techniques for improved communication reliability, reduced latency, and improved user experience related to an improved process in which a UE may switch networks when unable to receive service from the UEs main network.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for performing a network switching operation as described herein, or the processor 1340 and the memory 1330 may be otherwise configured to perform or support such operations.

Figure 14:
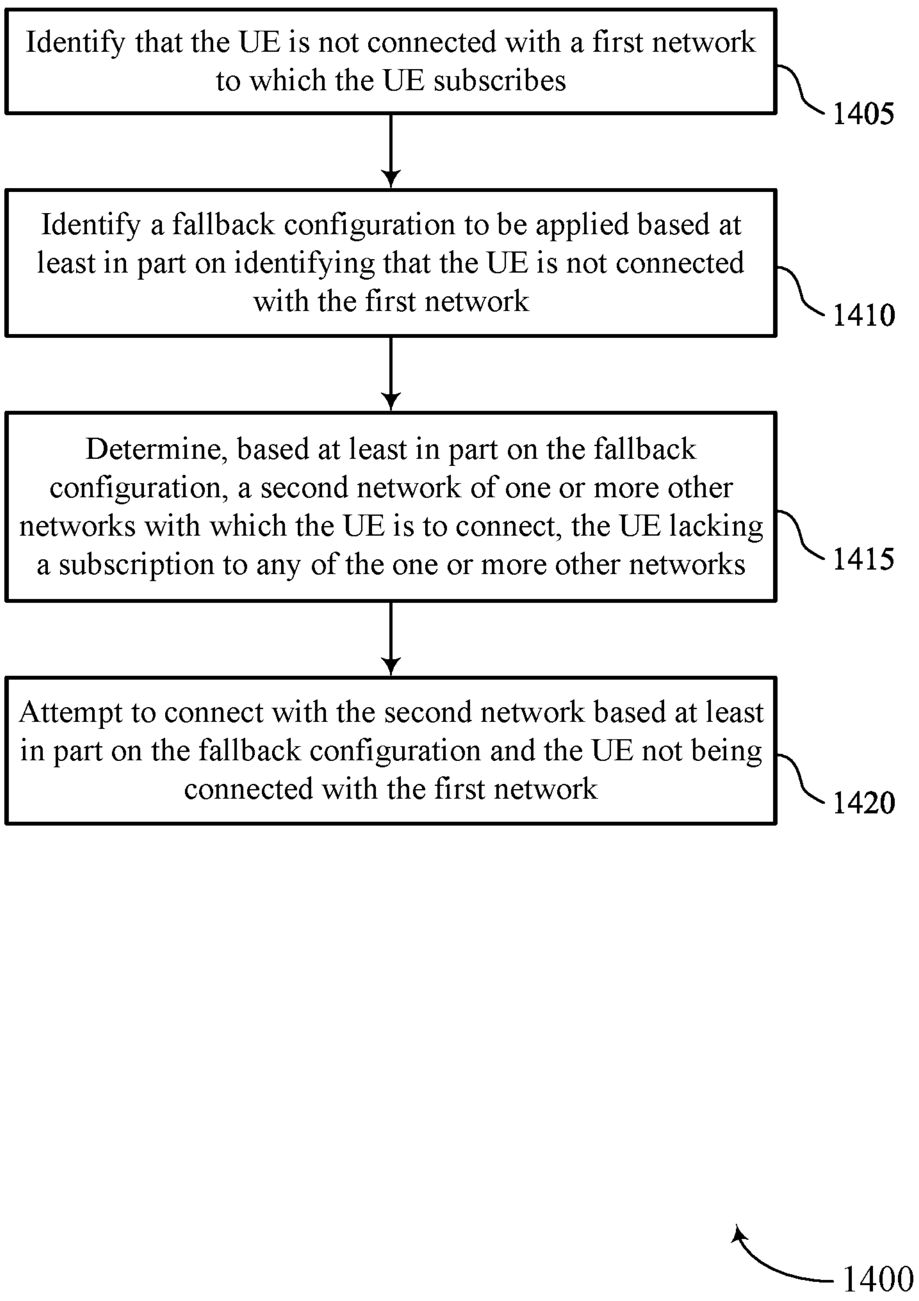
FIGS. 14 through 18 show flowcharts illustrating methods that support techniques for performing a network switching operation in accordance with aspects of the present disclosure.

FIG. 14 shows a flowchart illustrating a method 1400 that supports techniques for performing a network switching operation in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include identifying that the UE is not connected with a first network to which the UE subscribes. The operations of 1405 may be performed in accordance with examples as disclosed herein. In some examples, aspects of the operations of 1405 may be performed by a connection failure manager 825 as described with reference to FIG. 8.

At 1410, the method may include identifying a fallback configuration to be applied based on identifying that the UE is not connected with the first network. The operations of 1410 may be performed in accordance with examples as disclosed herein. In some examples, aspects of the operations of 1410 may be performed by a fallback configuration manager 830 as described with reference to FIG. 8.

At 1415, the method may include determining, based on the fallback configuration, a second network of one or more other networks with which the UE is to connect, the UE lacking a subscription to any of the one or more other networks. The operations of 1415 may be performed in accordance with examples as disclosed herein. In some examples, aspects of the operations of 1415 may be performed by a network switching manager 835 as described with reference to FIG. 8.

At 1420, the method may include attempting to connect with the second network based on the fallback configuration and the UE not being connected with the first network. The operations of 1420 may be performed in accordance with examples as disclosed herein. In some examples, aspects of the operations of 1420 may be performed by a network connection manager 840 as described with reference to FIG. 8.

Figure 15:
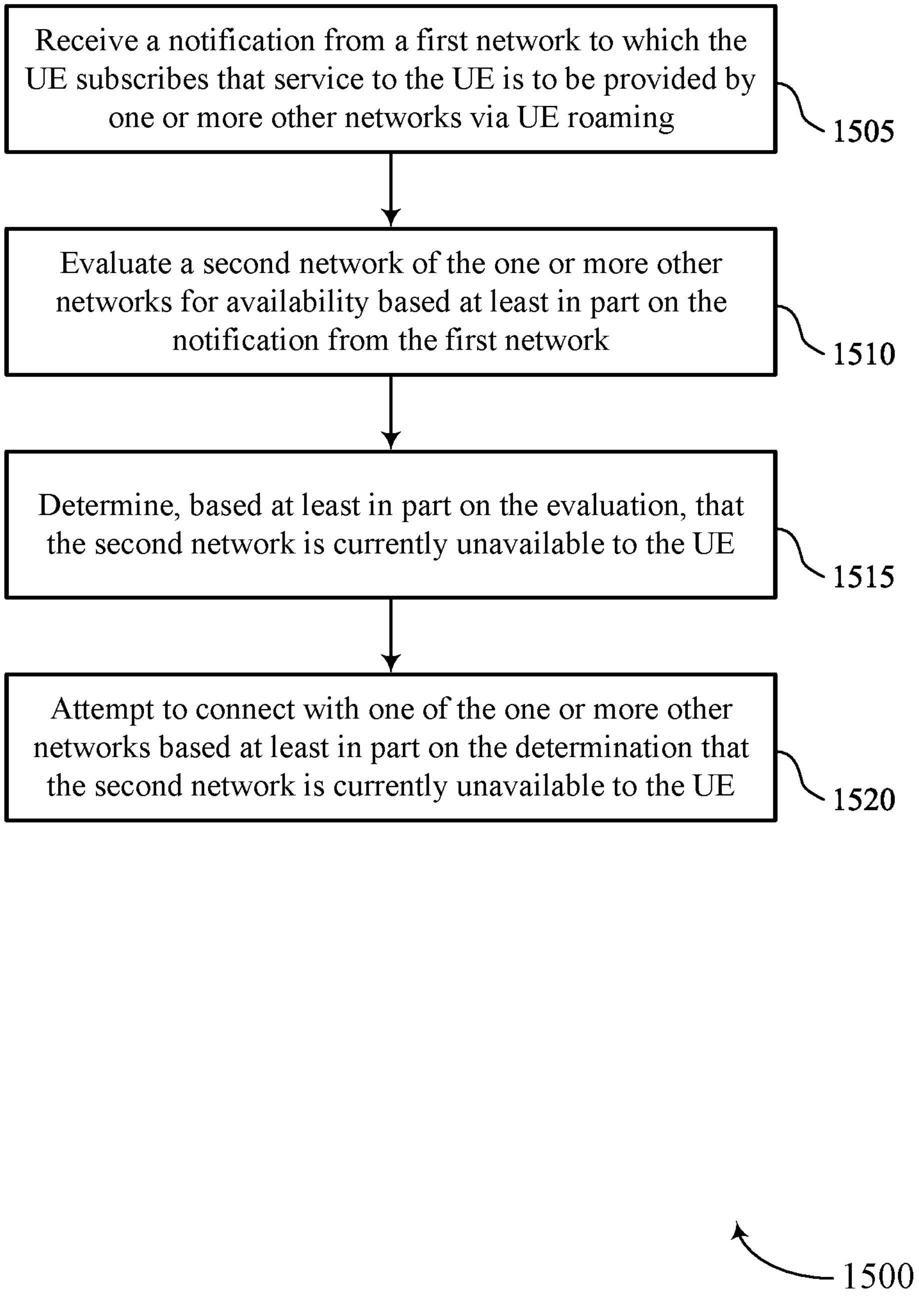

FIG. 15 shows a flowchart illustrating a method 1500 that supports techniques for performing a network switching operation in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving a notification from a first network to which the UE subscribes that service to the UE is to be provided by one or more other networks via UE roaming. The operations of 1505 may be performed in accordance with examples as disclosed herein. In some examples, aspects of the operations of 1505 may be performed by a service notification manager 845 as described with reference to FIG. 8.

At 1510, the method may include evaluating a second network of the one or more other networks for availability based on the notification from the first network. The operations of 1510 may be performed in accordance with examples as disclosed herein. In some examples, aspects of the operations of 1510 may be performed by a network availability evaluation manager 850 as described with reference to FIG. 8.

At 1515, the method may include determining, based on the evaluation, that the second network is currently unavailable to the UE. The operations of 1515 may be performed in accordance with examples as disclosed herein. In some examples, aspects of the operations of 1515 may be performed by a network availability determination manager 855 as described with reference to FIG. 8.

At 1520, the method may include attempting to connect with one of the one or more other networks based on the determination that the second network is currently unavailable to the UE. The operations of 1520 may be performed in accordance with examples as disclosed herein. In some examples, aspects of the operations of 1520 may be performed by a network connection component 860 as described with reference to FIG. 8.

Figure 16:
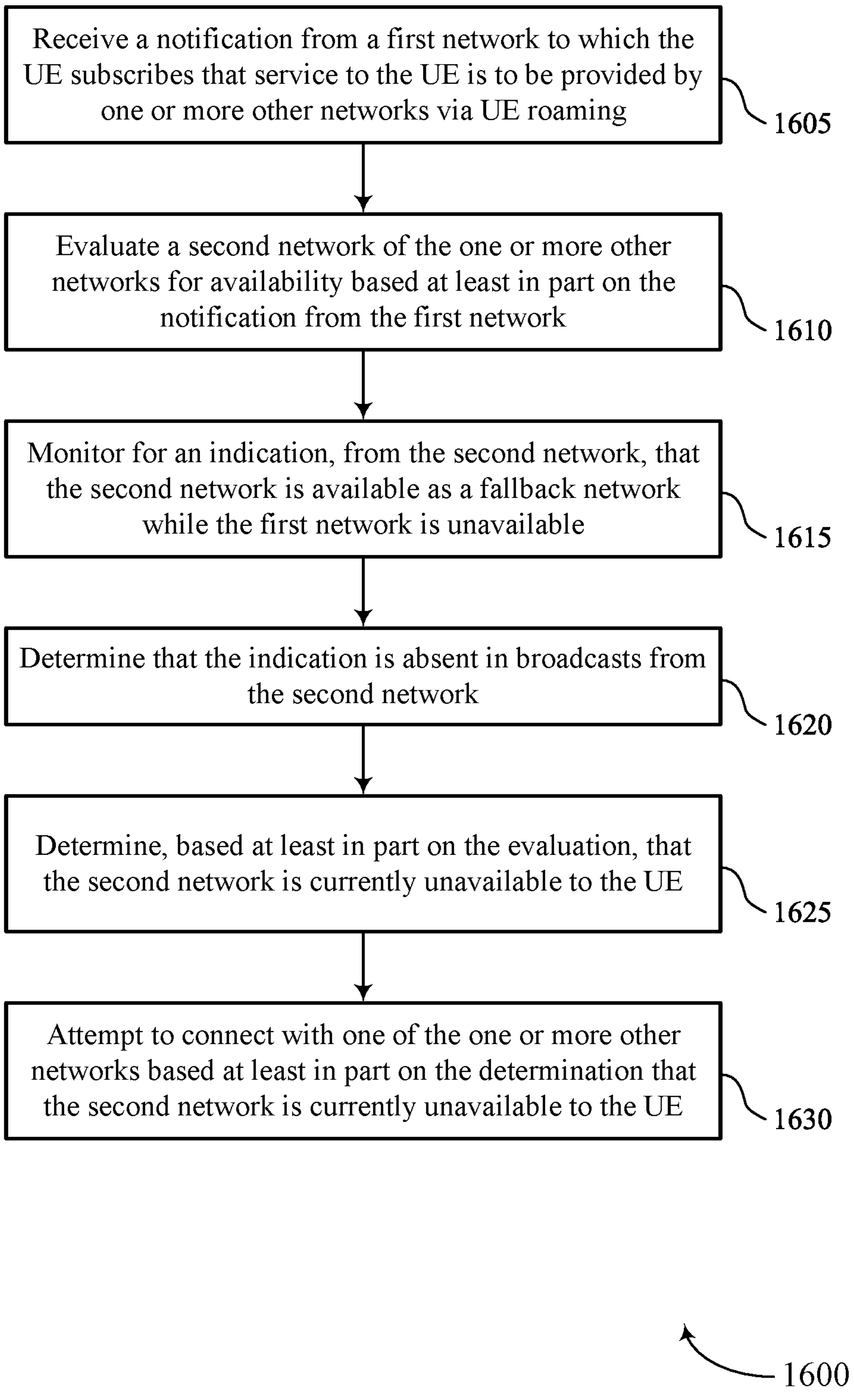

FIG. 16 shows a flowchart illustrating a method 1600 that supports techniques for performing a network switching operation in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving a notification from a first network to which the UE subscribes that service to the UE is to be provided by one or more other networks via UE roaming. The operations of 1605 may be performed in accordance with examples as disclosed herein. In some examples, aspects of the operations of 1605 may be performed by a service notification manager 845 as described with reference to FIG. 8.

At 1610, the method may include evaluating a second network of the one or more other networks for availability based on the notification from the first network. The operations of 1610 may be performed in accordance with examples as disclosed herein. In some examples, aspects of the operations of 1610 may be performed by a network availability evaluation manager 850 as described with reference to FIG. 8.

At 1615, the method may include monitoring for an indication, from the second network, that the second network is available as a fallback network while the first network is unavailable. The operations of 1615 may be performed in accordance with examples as disclosed herein. In some examples, aspects of the operations of 1615 may be performed by an indication monitoring manager 870 as described with reference to FIG. 8.

At 1620, the method may include determining that the indication is absent in broadcasts from the second network. The operations of 1620 may be performed in accordance with examples as disclosed herein. In some examples, aspects of the operations of 1620 may be performed by an indication monitoring manager 870 as described with reference to FIG. 8.

At 1625, the method may include determining, based on the evaluation, that the second network is currently unavailable to the UE. The operations of 1625 may be performed in accordance with examples as disclosed herein. In some examples, aspects of the operations of 1625 may be performed by a network availability determination manager 855 as described with reference to FIG. 8.

At 1630, the method may include attempting to connect with one of the one or more other networks based on the determination that the second network is currently unavailable to the UE. The operations of 1630 may be performed in accordance with examples as disclosed herein. In some examples, aspects of the operations of 1630 may be performed by a network connection component 860 as described with reference to FIG. 8.

Figure 17:
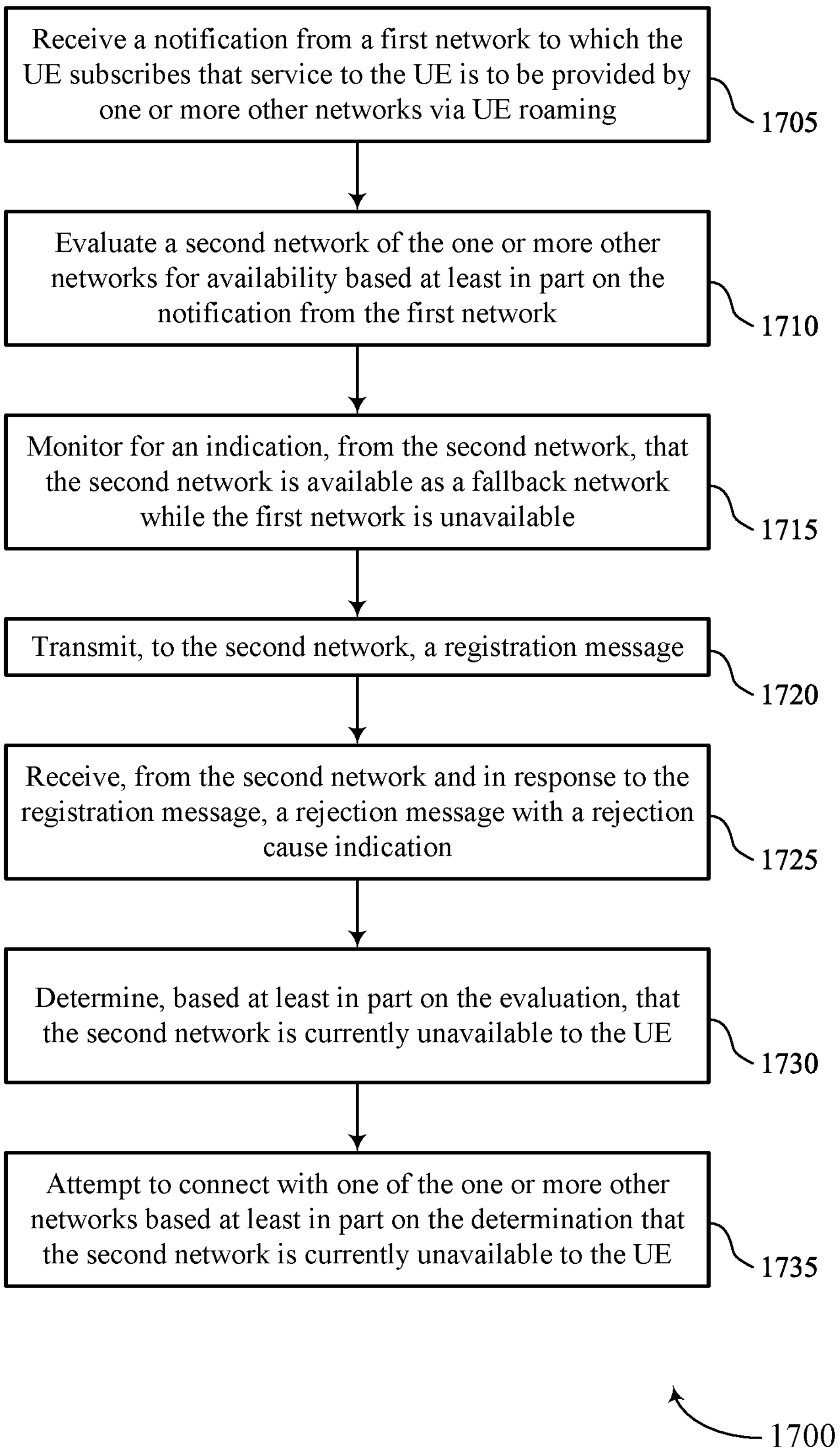

FIG. 17 shows a flowchart illustrating a method 1700 that supports techniques for performing a network switching operation in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include receiving a notification from a first network to which the UE subscribes that service to the UE is to be provided by one or more other networks via UE roaming. The operations of 1705 may be performed in accordance with examples as disclosed herein. In some examples, aspects of the operations of 1705 may be performed by a service notification manager 845 as described with reference to FIG. 8.

At 1710, the method may include evaluating a second network of the one or more other networks for availability based on the notification from the first network. The operations of 1710 may be performed in accordance with examples as disclosed herein. In some examples, aspects of the operations of 1710 may be performed by a network availability evaluation manager 850 as described with reference to FIG. 8.

At 1715, the method may include monitoring for an indication, from the second network, that the second network is available as a fallback network while the first network is unavailable. The operations of 1715 may be performed in accordance with examples as disclosed herein. In some examples, aspects of the operations of 1715 may be performed by an indication monitoring manager 870 as described with reference to FIG. 8.

At 1720, the method may include transmitting, to the second network, a registration message. The operations of 1720 may be performed in accordance with examples as disclosed herein. In some examples, aspects of the operations of 1720 may be performed by a registration transmission manager 885 as described with reference to FIG. 8.

At 1725, the method may include receiving, from the second network and in response to the registration message, a rejection message with a rejection cause indication. The operations of 1725 may be performed in accordance with examples as disclosed herein. In some examples, aspects of the operations of 1725 may be performed by a rejection reception manager 890 as described with reference to FIG. 8.

At 1730, the method may include determining, based on the evaluation, that the second network is currently unavailable to the UE. The operations of 1730 may be performed in accordance with examples as disclosed herein. In some examples, aspects of the operations of 1730 may be performed by a network availability determination manager 855 as described with reference to FIG. 8.

At 1735, the method may include attempting to connect with one of the one or more other networks based on the determination that the second network is currently unavailable to the UE. The operations of 1735 may be performed in accordance with examples as disclosed herein. In some examples, aspects of the operations of 1735 may be performed by a network connection component 860 as described with reference to FIG. 8.

Figure 18:
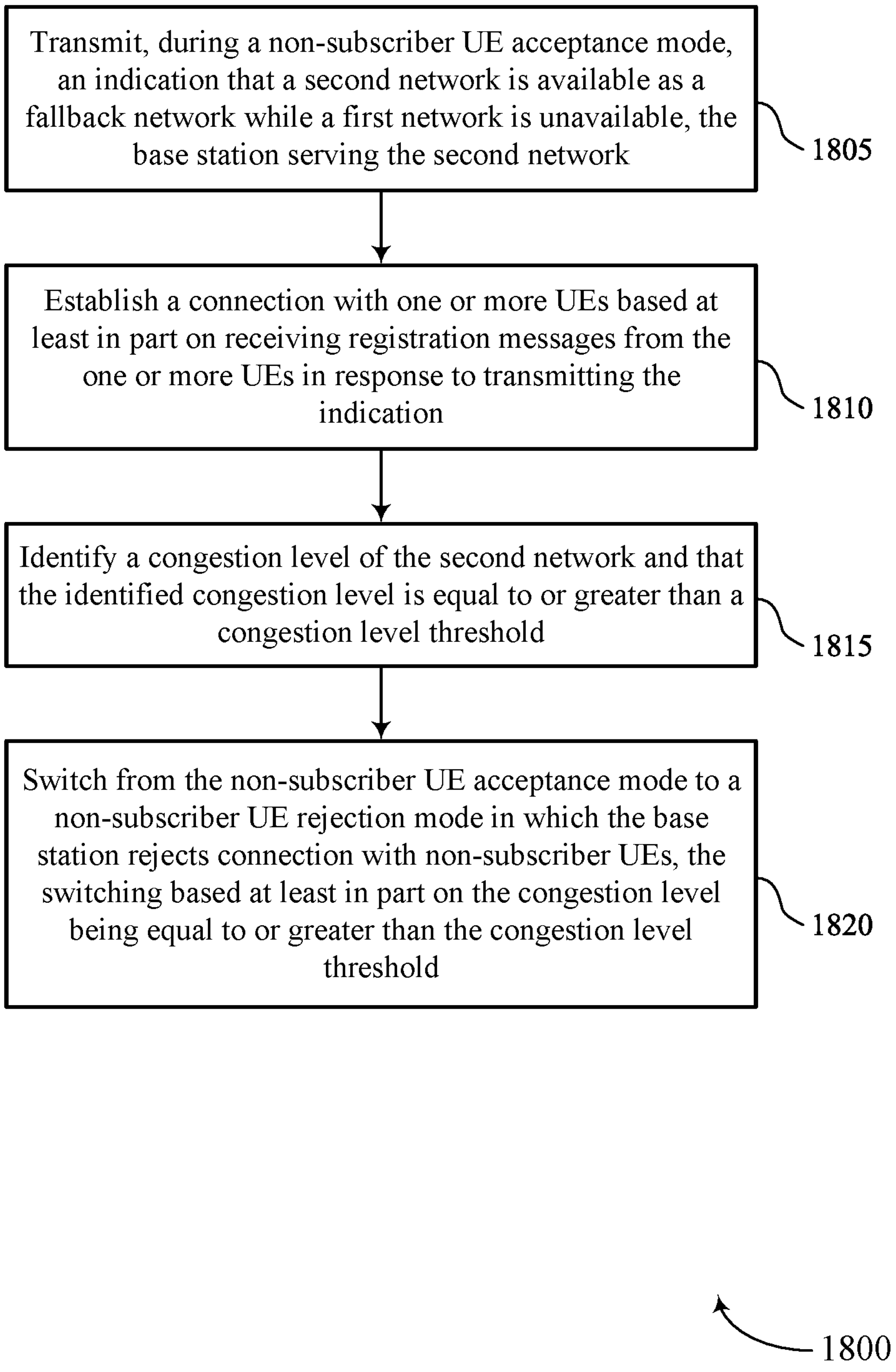

FIG. 18 shows a flowchart illustrating a method 1800 that supports techniques for performing a network switching operation in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include transmitting, during a non-subscriber UE acceptance mode, an indication that a second network is available as a fallback network while a first network is unavailable, the base station serving the second network. The operations of 1805 may be performed in accordance with examples as disclosed herein. In some examples, aspects of the operations of 1805 may be performed by a network availability indication component 1225 as described with reference to FIG. 12.

At 1810, the method may include establishing a connection with one or more UEs based on receiving registration messages from the one or more UEs in response to transmitting the indication. The operations of 1810 may be performed in accordance with examples as disclosed herein. In some examples, aspects of the operations of 1810 may be performed by a connection establishing component 1230 as described with reference to FIG. 12.

At 1815, the method may include identifying a congestion level of the second network and that the identified congestion level is equal to or greater than a congestion level threshold. The operations of 1815 may be performed in accordance with examples as disclosed herein. In some examples, aspects of the operations of 1815 may be performed by a congestion level component 1235 as described with reference to FIG. 12.

At 1820, the method may include switching from the non-subscriber UE acceptance mode to a non-subscriber UE rejection mode in which the base station rejects connection with non-subscriber UEs, the switching based on the congestion level being equal to or greater than the congestion level threshold. The operations of 1820 may be performed in accordance with examples as disclosed herein. In some examples, aspects of the operations of 1820 may be performed by a mode switching component 1240 as described with reference to FIG. 12.

The following provides an overview of aspects of the present disclosure:

Aspect 1: A method for wireless communications at a UE, comprising: identifying that the UE is not connected with a first network to which the UE subscribes; identifying a fallback configuration to be applied based at least in part on identifying that the UE is not connected with the first network; determining, based at least in part on the fallback configuration, a second network of one or more other networks with which the UE is to connect, the UE lacking a subscription to any of the one or more other networks; and attempting to connect with the second network based at least in part on the fallback configuration and the UE not being connected with the first network.

Aspect 2: The method of aspect 1, wherein identifying the fallback configuration further comprises: identifying a set of one or more networks that the UE is allowed to switch to while the first network is unavailable, the set of one or more networks arranged in a list based on a priority associated with each network.

Aspect 3: The method of aspect 2, wherein determining to connect with the second network further comprises: identifying a network in the set of one or more networks associated with a highest priority, the second network associated with the highest priority; and determining to establish a connection with the second network based at least in part on the second network being associated with the highest priority.

Aspect 4: The method of any of aspects 2 through 3, wherein determining to connect with the second network further comprises: identifying, at a first time, a network in the set of one or more networks associated with a highest priority, the second network associated with the highest priority; and determining, at a second time, to establish a connection with the second network based at least in part on the second network being associated with the highest priority, a duration between the first time and the second time being computed randomly within a configured range.

Aspect 5: The method of any of aspects 2 through 4, wherein the UE is configured with the set of one or more networks, the set of one or more networks included in a data file of a Universal Mobile Telecommunications Service (UMTS) subscriber identify module (USIM) of the UE.

Aspect 6: The method of any of aspects 2 through 5, further comprising: receiving the set of one or more networks via over-the-air (OTA) via a UE parameter update procedure or a steering of roaming procedure.

Aspect 7: The method of any of aspects 1 through 6, further comprising: determining, based at least in part on the attempting, that the second network is currently unavailable to the UE.

Aspect 8: The method of aspect 7, wherein attempting to connect with the second network further comprises: monitoring for an indication, from the second network, that the second network is available as a fallback network while the first network is unavailable.

Aspect 9: The method of aspect 8, wherein determining that the second network is currently unavailable to the UE further comprises: determining that the indication is absent in broadcasts from the second network.

Aspect 10: The method of any of aspects 8 through 9, wherein the UE monitors for the indication, from the second network, in an SIB.

Aspect 11: The method of any of aspects 7 through 10, wherein determining that the second network is currently unavailable to the UE further comprises: transmitting, to the second network, a registration message; and receiving, from the second network and in response to the registration message, a rejection message with a rejection cause indication.

Aspect 12: The method of aspect 11, wherein the rejection message comprises a back-off timer indicating a duration of time for the UE to refrain from attempting to establish a connection with the second network.

Aspect 13: The method of aspect 12, further comprising: transmitting, to the second network, a second registration message based at least in part on the back-off timer expiring.

Aspect 14: The method of any of aspects 7 through 13, further comprising: attempting to connect with one of the one or more other networks based at least in part on the determination that the second network is currently unavailable to the UE.

Aspect 15: A method for wireless communications at a UE, comprising: identifying that the UE is not connected with a first network to which the UE subscribes; identifying a fallback configuration to be applied based at least in part on identifying that the UE is not connected with the first network; determining, based at least in part on the fallback configuration, a second network of one or more other networks with which the UE is to connect, the UE lacking a subscription to any of the one or more other networks; and attempting to connect with the second network based at least in part on the fallback configuration and the UE not being connected with the first network.

Aspect 16: The method of aspect 15, further comprising: receiving a notification from the first network that service to the UE is to be provided by the one or more other networks via UE roaming, wherein identifying the fallback configuration is based at least in part on the notification from the first network.

Aspect 17: The method of aspect 16, wherein the notification from the first network indicates that the first network is unavailable.

Aspect 18: The method of any of aspects 16 through 17, wherein identifying the fallback configuration further comprises: identifying a set of networks that the UE is allowed to switch to while the first network is unavailable, the set of networks arranged in a list based on a priority associated with each network.

Aspect 19: The method of aspect 18, wherein determining to connect with the second network further comprises: identifying a network in the set of networks associated with a highest priority, the second network associated with the highest priority; and determining to establish a connection with the second network based at least in part on the second network being associated with the highest priority.

Aspect 20: The method of aspect 18, wherein determining to connect with the second network further comprises: identifying, at a first time, a network in the set of networks associated with a highest priority, the second network associated with the highest priority; and determining, at a second time, to establish a connection with the second network based at least in part on the second network being associated with the highest priority, a duration between the first time and the second time being computed randomly within a pre-configured range.

Aspect 21: The method of any of aspects 18 through 20, wherein the UE is configured with the set of networks, the set of networks included in a data file of a Universal Mobile Telecommunications Service (UMTS) subscriber identify module (USIM) of the UE.

Aspect 22: The method of any of aspects 18 through 20, further comprising: receiving the set of networks via over-the-air (OTA) via a UE parameter update procedure or a steering of roaming procedure.

Aspect 23: The method of any of aspects 16 through 22, wherein receiving the notification from the first network further comprises: receiving, from the first network, a deregistration message indicating to the UE to deregister from the first network.

Aspect 24: The method of aspect 23, wherein the deregistration message comprises a set of networks arranged in a list based on a priority associated with each network or an identifier of a network with which the UE is to connect, the UE determines to connect with the second network based at least in part on the deregistration message.

Aspect 25: The method of any of aspects 15 through 17, wherein identifying the fallback configuration further comprises: identifying a function for the UE to use to determine an access identity for the UE to use to determine which network of the one or more other networks with which to connect and to connect to the determined network.

Aspect 26: The method of aspect 25, further comprising: calculating a value based at least in part on the function, the value indicating an access identity of a set of access identities, wherein each network is associated with a particular access identity.

Aspect 27: The method of aspect 26, further comprising: determining one or more networks associated with the access identity indicated by the calculated value; and determining to establish a connection with the second network based at least in part on the second network being associated with the access identity indicated by the calculated value.

Aspect 28: The method of any of aspects 26 through 27, further comprising: determining that there is not a network available that is associated with the access identity indicated by the calculated value; and determining to connect with the second network of the one or more other networks, randomly, based at least in part on determining that there is not a network available that is associated with the access identity indicated by the calculated value.

Aspect 29: A method for wireless communications at a UE, comprising: receiving a notification from a first network to which the UE subscribes that service to the UE is to be provided by one or more other networks via UE roaming; evaluating a second network of the one or more other networks for availability based at least in part on the notification from the first network; determining, based at least in part on the evaluation, that the second network is currently unavailable to the UE; and attempting to connect with one of the one or more other networks based at least in part on the determination that the second network is currently unavailable to the UE.

Aspect 30: The method of aspect 29, wherein evaluating the second network of the one or more other networks for availability further comprises: monitoring for an indication, from the second network, that the second network is available as a fallback network while the first network is unavailable.

Aspect 31: The method of aspect 30, wherein determining that the second network is currently unavailable to the UE further comprises: determining that the indication is absent in broadcasts from the second network.

Aspect 32: The method of any of aspects 30 through 31, wherein determining that the second network is currently unavailable to the UE further comprises: transmitting, to the second network, a registration message; and receiving, from the second network and in response to the registration message, a rejection message with a rejection cause indication.

Aspect 33: The method of aspect 32, wherein the rejection cause indication indicates that the UE is to attempt connection with a different network than the second network of the one or more other networks.

Aspect 34: The method of aspect 33, wherein attempting to connect with one of the one or more other networks further comprises: attempting to connect with a third network of the one or more other networks based at least in part on the UE receiving the rejection cause indication from the second network.

Aspect 35: The method of aspect 32, wherein the rejection message comprises a back-off timer indicating a duration of time for the UE to refrain from attempting to establish a connection with the second network.

Aspect 36: The method of aspect 35, wherein attempting to connect with the one of the one or more other networks further comprises: transmitting, to the second network, a second registration message based at least in part on the back-off timer expiring.

Aspect 37: The method of any of aspects 30 through 36, wherein the UE monitors for the indication, from the second network, in an SIB.

Aspect 38: A method for wireless communications at a base station, comprising: transmitting, during a non-subscriber UE acceptance mode, an indication that a second network is available as a fallback network while a first network is unavailable, the base station serving the second network; establishing a connection with one or more UEs based at least in part on receiving registration messages from the one or more UEs in response to transmitting the indication; identifying a congestion level of the second network and that the identified congestion level is equal to or greater than a congestion level threshold; and switching from the non-subscriber UE acceptance mode to a non-subscriber UE rejection mode in which the base station rejects connection with non-subscriber UEs, the switching based at least in part on the congestion level being equal to or greater than the congestion level threshold.

Aspect 39: The method of aspect 38, wherein identifying the congestion level of the second network further comprises: receiving a message from an access and mobility management function (AMF) of the base station indicating the base station to switch to the non-subscriber UE rejection mode.

Aspect 40: The method of aspect 39, wherein the base station refrains from transmitting the indication that the second network is available as a fallback network.

Aspect 41: The method of aspect 39, further comprising: transmitting, during the non-subscriber UE rejection mode, the indication that the second network is available as a fallback network while the first network is unavailable; receiving registration messages from the one or more UEs in response to transmitting the indication; and transmitting, to the one or more UEs, a rejection message with a rejection cause indication.

Aspect 42: The method of aspect 41, wherein the rejection message comprises an indication for each of the one or more UEs to attempt connection with a different network than the second network.

Aspect 43: The method of any of aspects 41 through 42, wherein the rejection message comprises a back-off timer indicating a duration of time for each of the one or more UEs to refrain from attempting to establish connection with the second network.

Aspect 44: The method of aspect 43, further comprising: receiving, from one or more of the one or more UEs, a second registration message based at least in part on the back-off timer expiring.

Aspect 45: The method of any of aspects 38 through 44, further comprising: receiving a notification that the first network to which one or more UEs subscribe is unavailable and that the one or more UEs are to attempt to connect with one or more other networks via roaming.

Aspect 46: The method of aspect 45, wherein transmitting the indication during the non-subscriber UE acceptance mode is based at least in part on receiving the notification that the first network to which one or more UEs subscribe is unavailable.

Aspect 47: An apparatus for wireless communications at a UE, comprising a processor; memory coupled with the processor; and instructions stored in the memory and executable by the processor to cause the apparatus to perform a method of any of aspects 1 through 14.

Aspect 48: An apparatus for wireless communications at a UE, comprising at least one means for performing a method of any of aspects 1 through 14.

Aspect 49: A non-transitory computer-readable medium storing code for wireless communications at a UE, the code comprising instructions executable by a processor to perform a method of any of aspects 1 through 14.

Aspect 50: An apparatus for wireless communications at a UE, comprising a processor; memory coupled with the processor; and instructions stored in the memory and executable by the processor to cause the apparatus to perform a method of any of aspects 15 through 28.

Aspect 51: An apparatus for wireless communications at a UE, comprising at least one means for performing a method of any of aspects 15 through 28.

Aspect 52: A non-transitory computer-readable medium storing code for wireless communications at a UE, the code comprising instructions executable by a processor to perform a method of any of aspects 15 through 28.

Aspect 53: An apparatus for wireless communications at a UE, comprising a processor; memory coupled with the processor; and instructions stored in the memory and executable by the processor to cause the apparatus to perform a method of any of aspects 29 through 37.

Aspect 54: An apparatus for wireless communications at a UE, comprising at least one means for performing a method of any of aspects 29 through 37.

Aspect 55: A non-transitory computer-readable medium storing code for wireless communications at a UE, the code comprising instructions executable by a processor to perform a method of any of aspects 29 through 37.

Aspect 56: An apparatus for wireless communications at a base station, comprising a processor; memory coupled with the processor; and instructions stored in the memory and executable by the processor to cause the apparatus to perform a method of any of aspects 38 through 46.

Aspect 57: An apparatus for wireless communications at a base station, comprising at least one means for performing a method of any of aspects 38 through 46.

Aspect 58: A non-transitory computer-readable medium storing code for wireless communications at a base station, the code comprising instructions executable by a processor to perform a method of any of aspects 38 through 46.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

- receiving, from a first network to which the UE subscribes, an indication of one or more identifiers corresponding to one or more networks, the UE lacking a subscription to any of the one or more networks;
- identifying that the UE is not connected with the first network to which the UE subscribes;
- identifying a fallback configuration to be applied based at least in part on identifying that the UE is not connected with the first network;
- determining, based at least in part on the fallback configuration and the indication from the first network of the one or more identifiers corresponding to the one or more networks, a second network of the one or more networks with which the UE is to connect; and attempting to connect with the second network based at least in part on the fallback configuration and the UE not being connected with the first network.

2. The method of claim 1, wherein identifying the fallback configuration further comprises:

identifying the UE is allowed to switch to the one or more networks while the first network is unavailable, the set of one or more networks arranged in a list based on a priority associated with each network.

3. The method of claim 2, wherein determining to connect with the second network further comprises:

identifying the second network in the one or more networks is associated with a highest priority; and determining to establish a connection with the second network based at least in part on the second network being associated with the highest priority.

4. The method of claim 2, wherein determining to connect with the second network further comprises:

identifying, at a first time, the second network in the one or more networks is associated with a highest priority; and determining, at a second time, to establish a connection with the second network based at least in part on the second network being associated with the highest priority, a duration between the first time and the second time being computed randomly within a configured range.

5. The method of claim 2, wherein the UE is configured, from the first network, with the one or more networks, the one or more networks included in a data file of a Universal Mobile Telecommunications Service (UMTS) subscriber identify module (USIM) of the UE.

6. The method of claim 2, wherein receiving the indication of the one or more identifiers comprises:

receiving the indication of the one or more identifiers corresponding to the one or more networks via over-the-air (OTA) via a UE parameter update procedure or a steering of roaming procedure.

7. The method of claim 1, further comprising:

determining, based at least in part on the attempting, that the second network is currently unavailable to the UE.

8. The method of claim 7, wherein attempting to connect with the second network further comprises:

monitoring for an indication, from the second network, that the second network is available as a fallback network while the first network is unavailable.

9. The method of claim 8, wherein determining that the second network is currently unavailable to the UE further comprises:

determining that the indication is absent in broadcasts from the second network.

10. The method of claim 8, wherein the UE monitors for the indication, from the second network, in a system information block (SIB).

11. The method of claim 7, wherein determining that the second network is currently unavailable to the UE further comprises:

transmitting, to the second network, a registration message; and receiving, from the second network and in response to the registration message, a rejection message with a rejection cause indication.

12. The method of claim 11, wherein the rejection message comprises a back-off timer indicating a duration of time for the UE to refrain from attempting to establish a connection with the second network.

13. The method of claim 12, further comprising:

transmitting, to the second network, a second registration message based at least in part on the back-off timer expiring.

14. The method of claim 7, further comprising:

attempting to connect with a third network of the one or more networks based at least in part on the determination that the second network is currently unavailable to the UE.

15. An apparatus for wireless communications at a user equipment (UE), comprising:

one or more memories; and one or more processors coupled with the one or more memories, the one or more processors configured to:

receive, from a first network to which the UE subscribes, an indication of one or more identifiers corresponding to one or more networks, the UE lacking a subscription to any of the one or more networks;

identify that the UE is not connected with the first network to which the UE subscribes;

identify a fallback configuration to be applied based at least in part on identifying that the UE is not connected with the first network;

determine, based at least in part on the fallback configuration and the indication from the first network of the one or more identifiers corresponding to the one or more networks, a second network of the one or more networks with which the UE is to connect; and attempt to connect with the second network based at least in part on the fallback configuration and the UE not being connected with the first network.

16. The apparatus of claim 15, wherein, to identify the fallback configuration, the one or more processors are configured to:

identify the UE is allowed to switch to the one or more networks while the first network is unavailable, the one or more networks arranged in a list based on a priority associated with each network.

17. The apparatus of claim 16, wherein, to determine to connect with the second network, the one or more processors are configured to:

identify the second network in the one or more networks is associated with a highest priority; and determine to establish a connection with the second network based at least in part on the second network being associated with the highest priority.

18. The apparatus of claim 16, wherein, to connect with the second network, the one or more processors are configured to:

identify, at a first time, the second network in the one or more networks is associated with a highest priority; and determine, at a second time, to establish a connection with the second network based at least in part on the second network being associated with the highest priority, a duration between the first time and the second time being computed randomly within a configured range.

19. The apparatus of claim 16, wherein the UE is configured, by the first network, with the one or more networks, the one or more networks included in a data file of a Universal Mobile Telecommunications Service (UMTS) subscriber identify module (USIM) of the UE.

20. The apparatus of claim 16, wherein, to receive the indication of the one or more identifiers, the one or more processors are configured to:

receive the indication of the one or more identifiers corresponding to the one or more networks via over-the-air (OTA) via a UE parameter update procedure or a steering of roaming procedure.

21. The apparatus of claim 15, wherein the one or more processors are further configured to:

determine, based at least in part on the attempting, that the second network is currently unavailable to the UE.

22. The apparatus of claim 21, wherein, to attempt to connect with the second network, the one or more processors are configured to:

monitor for an indication, from the second network, that the second network is available as a fallback network while the first network is unavailable.

23. The apparatus of claim 22, wherein, to determine that the second network is currently unavailable to the UE, the one or more processors are configured to:

determine that the indication is absent in broadcasts from the second network.

24. The apparatus of claim 22, wherein:

the UE monitors for the indication, from the second network, in a system information block (SIB).

25. The apparatus of claim 21, wherein, to determine that the second network is currently unavailable to the UE, the one or more processors are configured to:

transmit, to the second network, a registration message; and receive, from the second network and in response to the registration message, a rejection message with a rejection cause indication.

26. The apparatus of claim 25, wherein the rejection message comprises a back-off timer indicating a duration of time for the UE to refrain from attempting to establish a connection with the second network.

27. The apparatus of claim 26, wherein the one or more processors are further configured to:

transmit, to the second network, a second registration message based at least in part on the back-off timer expiring.

28. The apparatus of claim 21, wherein the one or more processors are further configured to:

attempt to connect with a third network of the one or more networks based at least in part on the determination that the second network is currently unavailable to the UE.

29. An apparatus for wireless communications at a user equipment (UE), comprising:

means for receiving, from a first network to which the UE subscribes, an indication of one or more identifiers corresponding to one or more networks, the UE lacking a subscription to any of the one or more networks;

means for identifying that the UE is not connected with the first network to which the UE subscribes;

means for identifying a fallback configuration to be applied based at least in part on identifying that the UE is not connected with the first network;

means for determining, based at least in part on the fallback configuration and the indication from the first network of the one or more identifiers corresponding to the one or more networks, a second network of the one or more networks with which the UE is to connect; and means for attempting to connect with the second network based at least in part on the fallback configuration and the UE not being connected with the first network.

30. A non-transitory computer-readable medium storing code for wireless communications at a user equipment (UE), the code comprising instructions executable by at least one processor to:

receive, from a first network to which the UE subscribes, an indication of one or more identifiers corresponding to one or more networks, the UE lacking a subscription to any of the one or more networks;

identify that the UE is not connected with the first network to which the UE subscribes;

identify a fallback configuration to be applied based at least in part on identifying that the UE is not connected with the first network;

determine, based at least in part on the fallback configuration and the indication from the first network of the one or more identifiers corresponding to the one or more networks, a second network of the one or more networks with which the UE is to connect; and attempt to connect with the second network based at least in part on the fallback configuration and the UE not being connected with the first network.

31. A method for wireless communications at a user equipment (UE), comprising:

receiving, from a first network to which the UE subscribes, an indication of one or more identifiers corresponding to one or more networks;

identifying that the UE is not connected with a first network to which the UE subscribes;

identifying a fallback configuration to be applied based at least in part on identifying that the UE is not connected with the first network;

determining, based at least in part on the fallback configuration and the indication from the first network of the one or more identifiers corresponding to the one or more networks, a second network of the one or more networks to which the UE is allowed to connect while the first network is unavailable, wherein the UE is provisioned by the first network with the one or more networks; and attempting to connect with the second network based at least in part on the fallback configuration and the UE not being connected with the first network.

32. The method of claim 31, wherein identifying the fallback configuration further comprises:

identifying the UE is allowed to switch to the one or more networks while the first network is unavailable, the one or more networks arranged in a list based on a priority associated with each network.

33. The method of claim 32, wherein determining the second network further comprises:

identifying the second network in the one or more networks is associated with a highest priority; and determining to establish a connection with the second network based at least in part on the second network being associated with the highest priority.

34. The method of claim 32, wherein determining the second network further comprises:

identifying, at a first time, the second network in the one or more networks is associated with a highest priority; and determining, at a second time, to establish a connection with the second network based at least in part on the second network being associated with the highest priority, a duration between the first time and the second time being computed randomly within a configured range.

35. An apparatus for wireless communications at a user equipment (UE), comprising:

at least one processor;

at least one memory coupled with the at least one processor; and instructions stored in the at least one memory and executable by the at least one processor to cause the apparatus to:

receive, from a first network to which the UE subscribes, an indication of one or more identifiers corresponding to one or more networks;

identify that the UE is not connected with a first network to which the UE subscribes;

identify a fallback configuration to be applied based at least in part on identifying that the UE is not connected with the first network;

determine, based at least in part on the fallback configuration and the indication from the first network of the one or more identifiers corresponding to the one or more networks, a second network of the one or more networks to which the UE is allowed to connect while the first network is unavailable, wherein the UE is provisioned by the first network with the one or more networks; and attempt to connect with the second network based at least in part on the fallback configuration and the UE not being connected with the first network.

* * * * *